Sept. 14, 1965    J. DOUGLASS, JR    3,206,188
HYDRAULICALLY ACTUATED SURGICAL OPERATING TABLES
Filed Aug. 28, 1961    10 Sheets-Sheet 1

INVENTOR.
JOHN DOUGLASS, JR.

BY
ATTORNEY

Sept. 14, 1965  J. DOUGLASS, JR  3,206,188
HYDRAULICALLY ACTUATED SURGICAL OPERATING TABLES
Filed Aug. 28, 1961  10 Sheets-Sheet 3

*INVENTOR.*
JOHN DOUGLASS, JR.
BY
ATTORNEY

INVENTOR.
JOHN DOUGLASS, JR.
BY
ATTORNEY

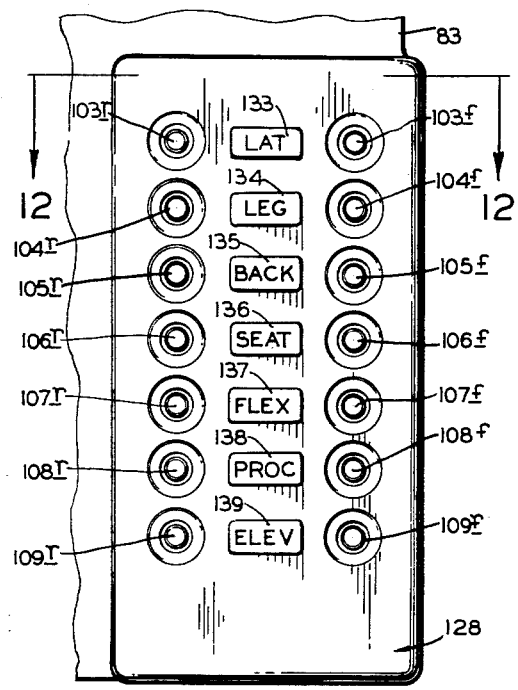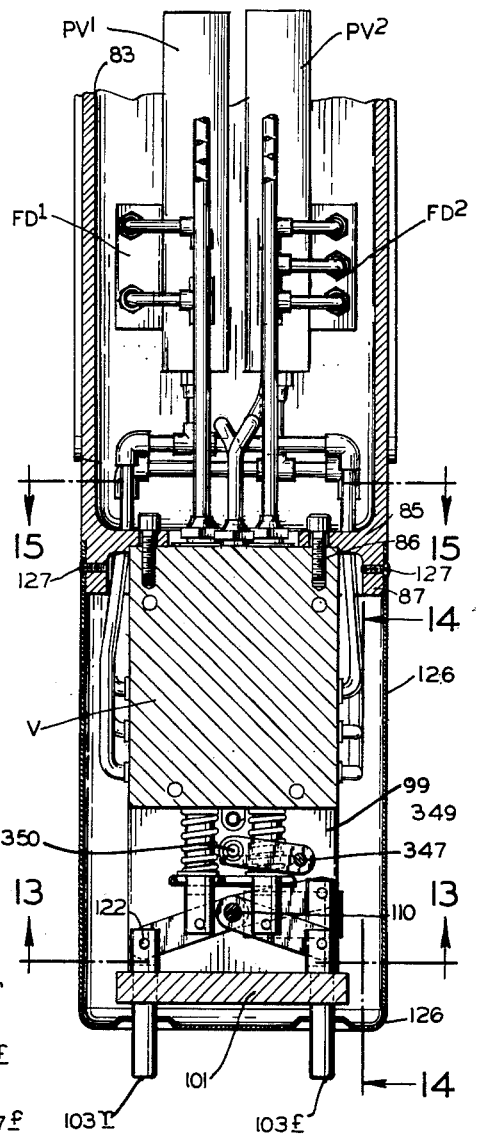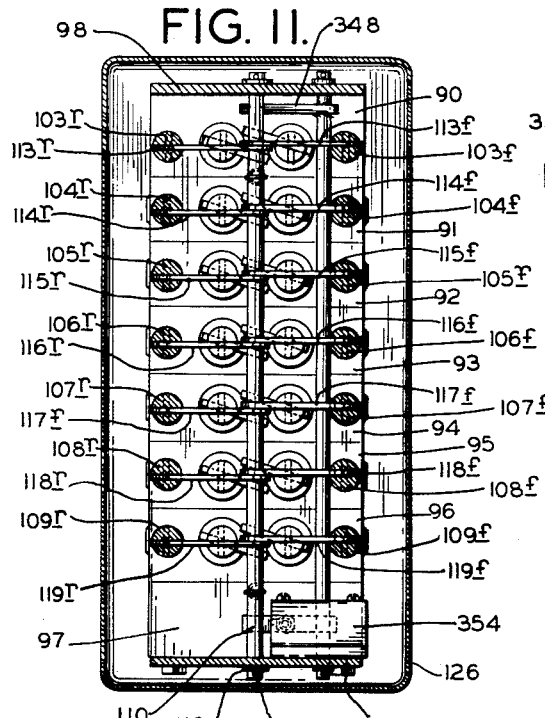

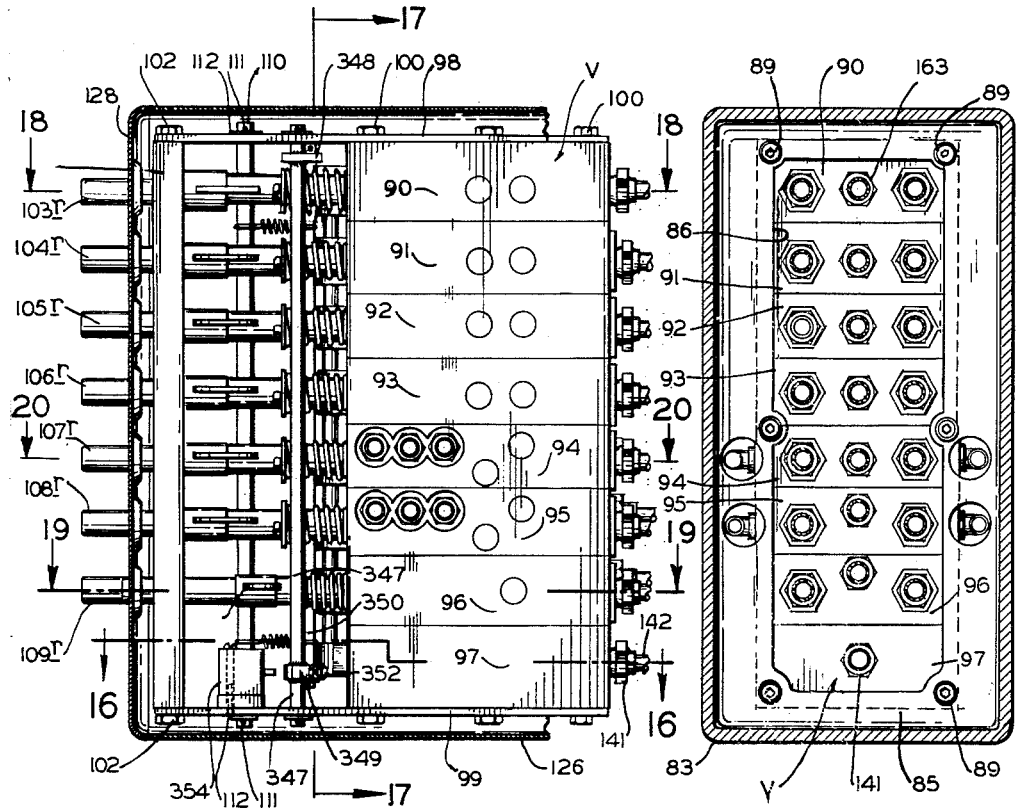
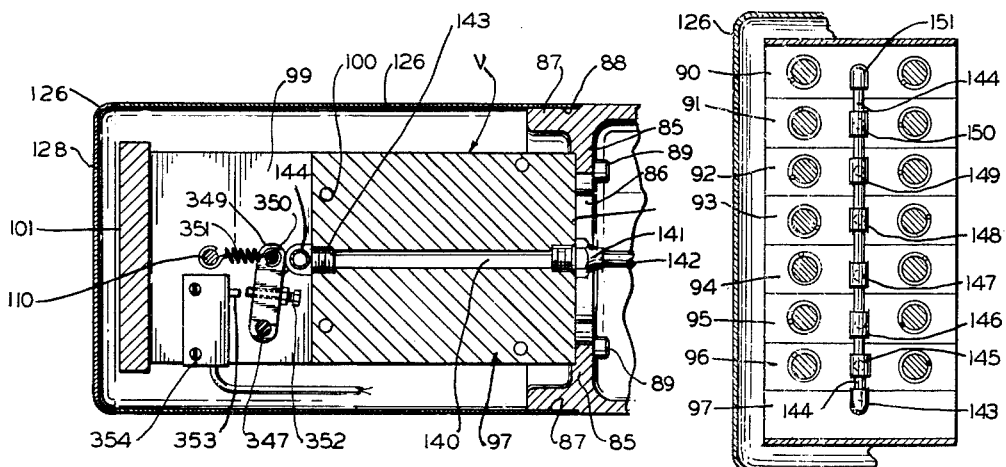

Sept. 14, 1965 J. DOUGLASS, JR 3,206,188
HYDRAULICALLY ACTUATED SURGICAL OPERATING TABLES
Filed Aug. 28, 1961 10 Sheets-Sheet 7

INVENTOR.
JOHN DOUGLASS, JR.
BY
*Alfred W. Petchaft*
ATTORNEY

INVENTOR.
JOHN DOUGLASS, JR.

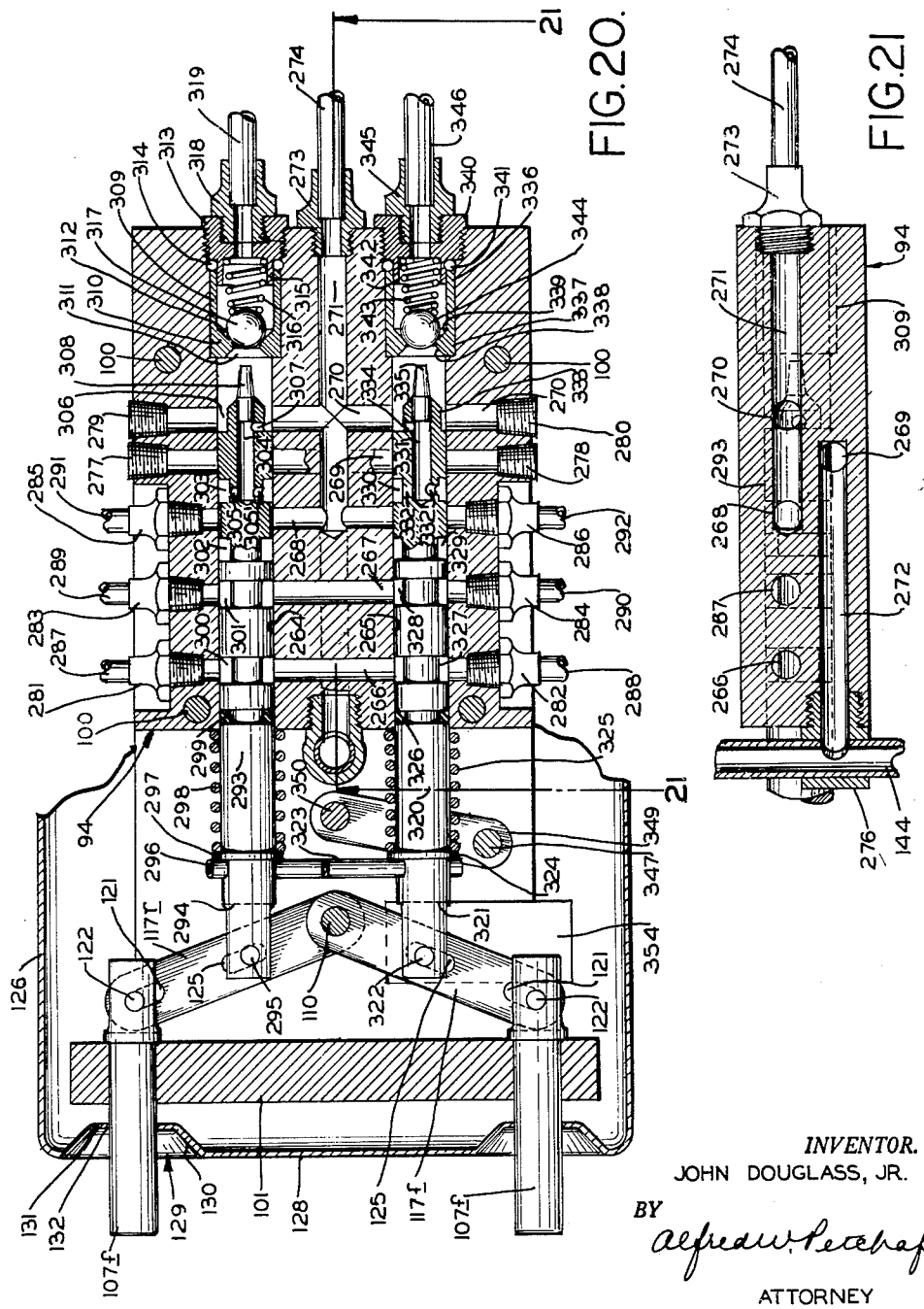

United States Patent Office 3,206,188
Patented Sept. 14, 1965

3,206,188
HYDRAULICALLY ACTUATED SURGICAL
OPERATING TABLES
John Douglass, Jr., St. Louis, Mo., assignor to Shampaine Industries, Inc., St. Louis, Mo., a corporation of Missouri
Filed Aug. 28, 1961, Ser. No. 134,218
22 Claims. (Cl. 269—325)

This invention relates in general to certain new and useful improvements in operating tables of the type ordinarily used in performing major surgery and, more particularly, to a hydraulically actuated operating table.

Heretofore, there have been surgical operating tables with articulated top section so that the table could be placed in various surgical positions. These surgical operating tables were sometimes hydraulically operated. However, such tables were fairly inefficient and sometimes dangerous due to the fact that there was no provision for stable retention of the piston in a selected position within hydraulic cylinders. Such cylinders, moreover, would not instantaneosly respond to an anesthetist or other person operating the controls.

It is, therefore, the primary object of the present invention to provide an operating table having an articulated top, which may be laterally and longitudinally tilted as a unit and adjusted so that the various sections of the top may assume a variety of positions required for surgical operations.

It is also an object of the present invention to provide an operating table of the type stated in which the articulated top sections may be adjusted to the various positions by a push-button type selector panel located on an arm outside of the sterile field near the head of the table and are accessible to the anesthetist or other person manipulating the operating table from the seated position.

It is another object of the present invention to provide an operating table of the type stated that eliminates the need of manual power to adjust sections of the operating table to any of the various positions.

It is also an object of the present invention to provide an operating table of the type stated in which the top section actuating means will hold a selected position without change under load.

It is an additional object of the present invention to provide an operating table of the type stated in which the articulated top sections are moved to various positions by hydraulic means and will remain precisely in such position.

With the above and other objects in view, my invention resides in the novel features of form, construction, arrangement, function, and combination of parts presently described and pointed out in the claims.

In the accompanying drawings (ten sheets):

Figure 1:
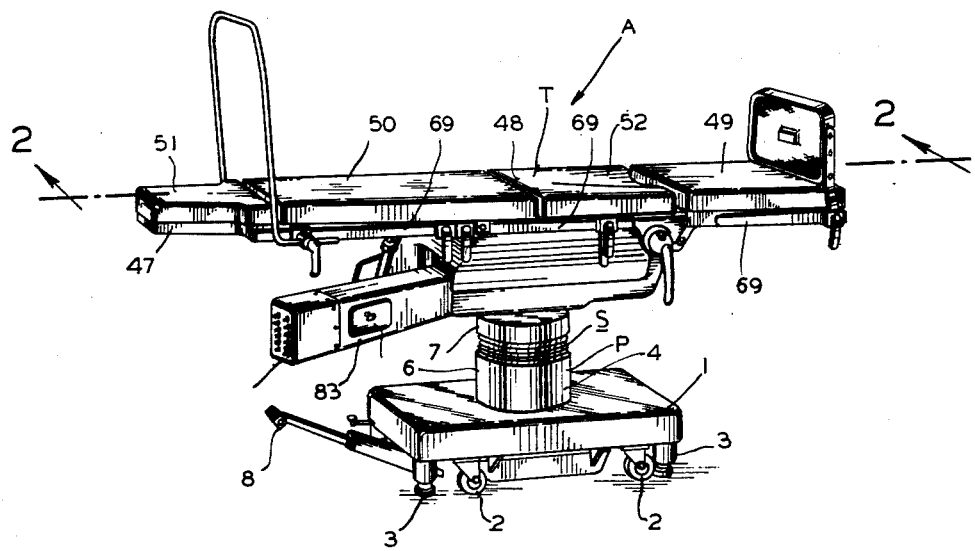
FIG. 1 is a perspective view of an operating table constructed in accordance with and embodying the present invention.
Figure 2:
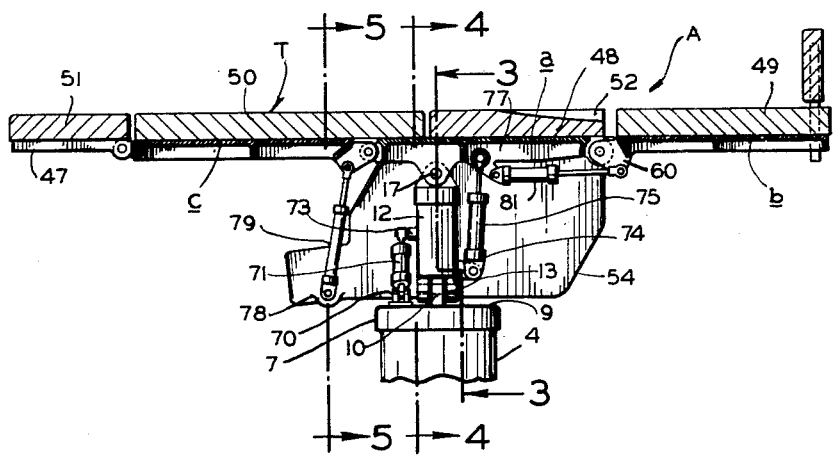
FIG. 2 is a fragmentary sectional view taken along line 2—2 of FIG. 1.
Figure 3:
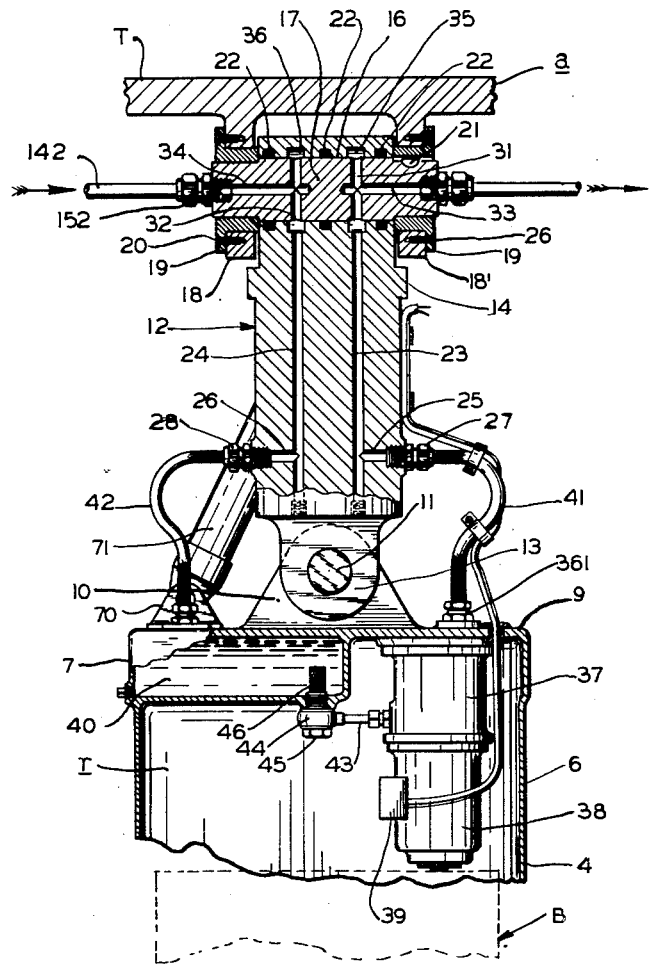
Figure 4:
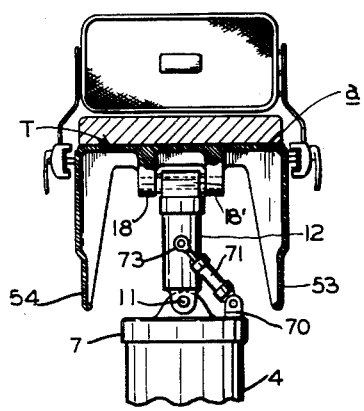
Figure 6:
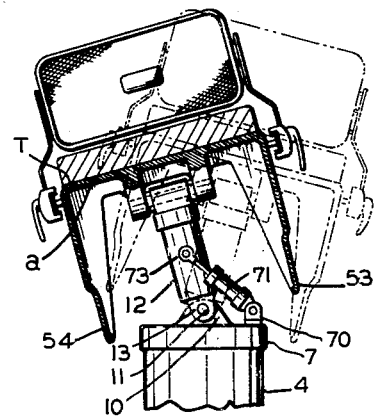
Figure 7:
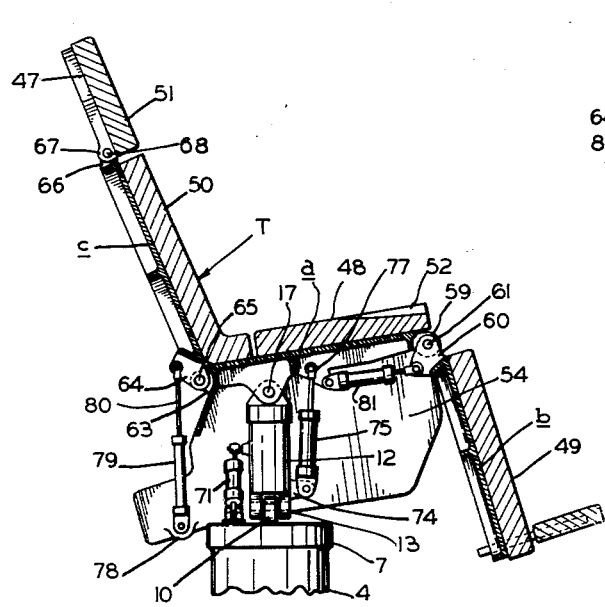
Figure 5:
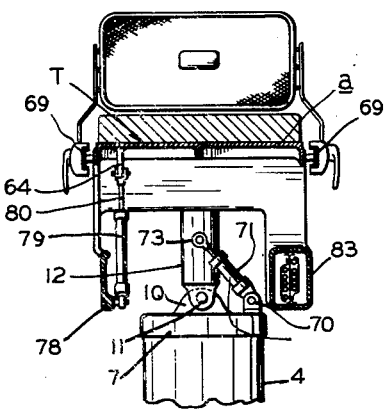
Figure 8:
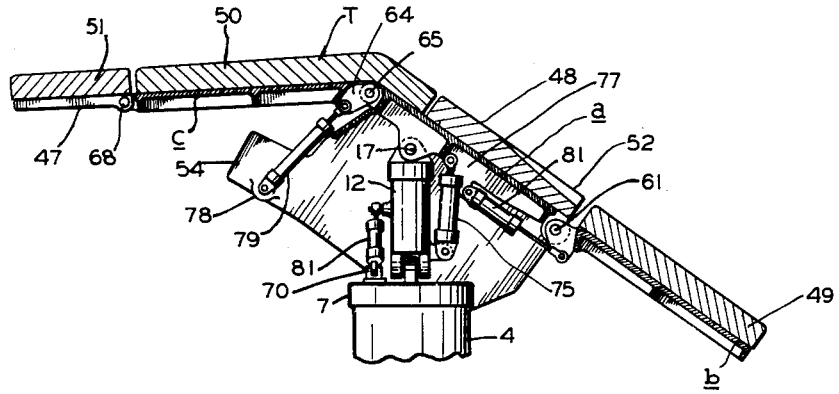
Figure 9:
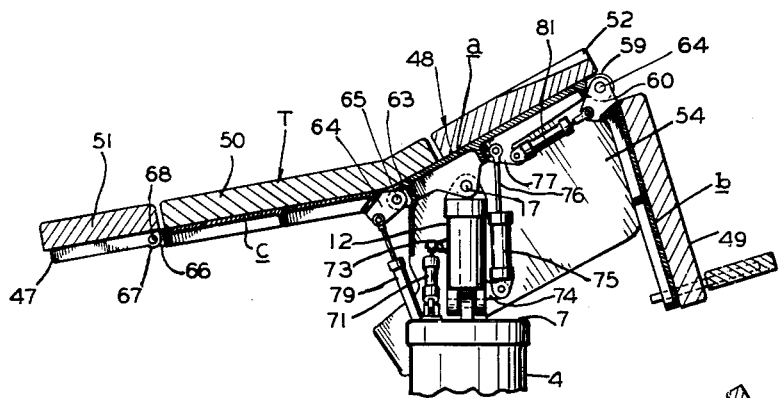
Figure 10:
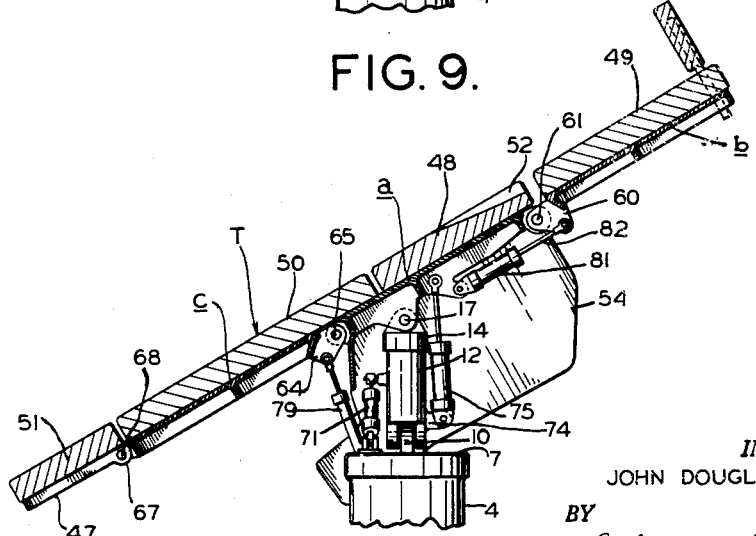

FIGS. 3, 4, and 5, are fragmentary sectional views taken along lines 3—3, 4—4, and 5—5, respectively, of FIG. 2;

FIG. 6 is a fragmentary sectional view of the operating table in a lateral tilt position;

FIG. 7 is a fragmentary sectional view of the operating table in the neurosurgical or chair position;

FIG. 8 is a fragmentary sectional view of the operating table in the flex position;

FIG. 9 is a fragmentary sectional view of the operating table in the proctoscopic position;

FIG. 10 is a fragmentary sectional view of the operating table in the Trendelenburg position;

FIG. 11 is a front elevational view of the push-button type selector panel on the operating table;

FIG. 12 is a fragmentary sectional view taken along line 12—12 of FIG. 11;

FIGS. 13, 14, and 15, are fragmentary sectional views taken along lines 13—13, 14—14, and 15—15, respectively, of FIG. 12;

FIGS. 16, 17, 18, 19, and 20, are fragmentary sectional views taken along lines 16—16, 17—17, 18—18, 19—19, and 20—20, respectively, of FIG. 14;

FIG. 21 is a fragmentary sectional view taken along line 21—21 of FIG. 20; and

Figure 22:
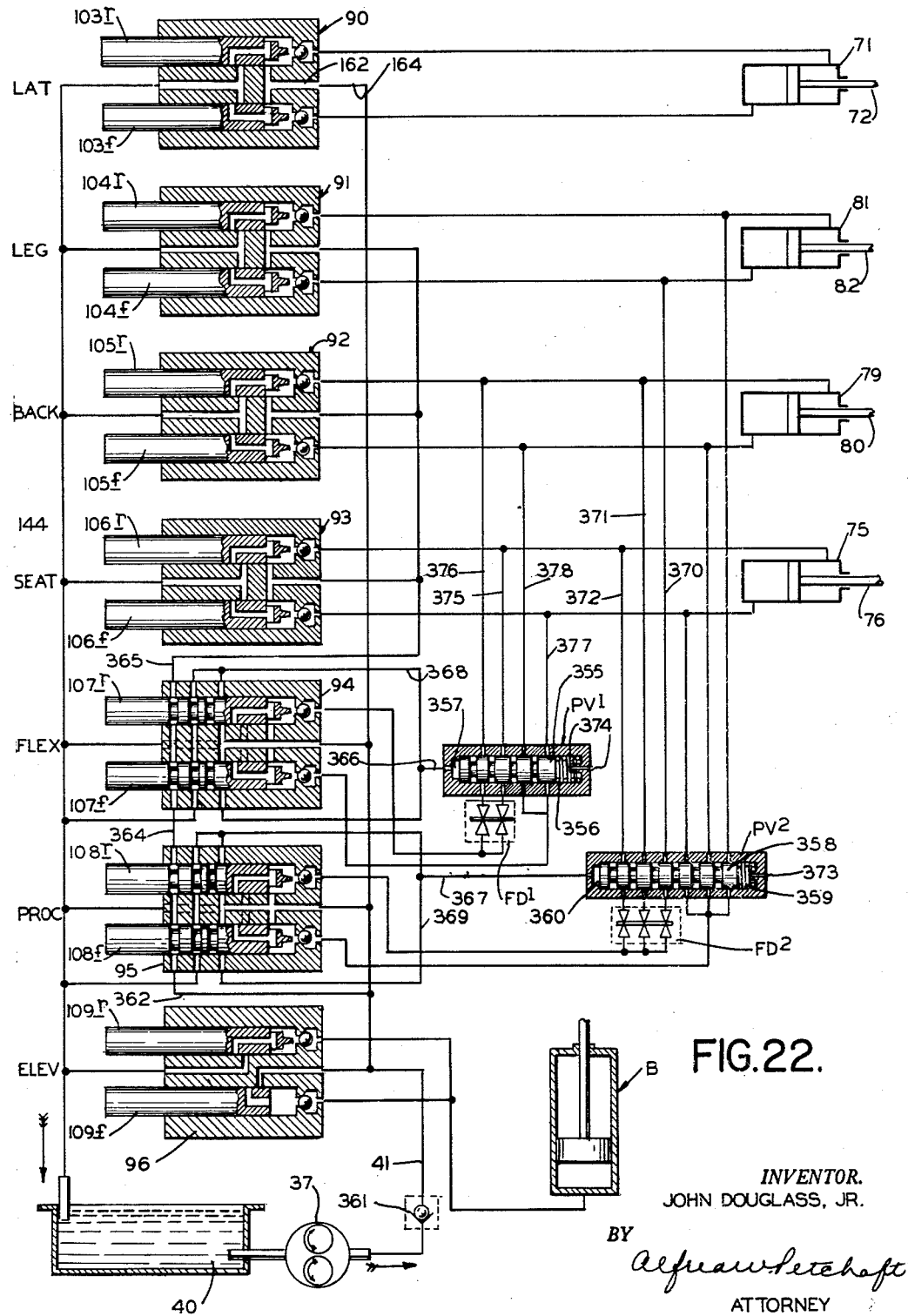

FIG. 22 is a schematic view showing the selector valves, the pumping means, hydraulic cylinders, and connecting hydraulic circuitry.

Referring now in more detail and by reference characters to the drawings, which illustrate a preferred embodiment of the present invention, A designates an operating table comprising a pedestal assembly P including a base member 1 provided with depending casters 2 and and at its four corners with floor-contacting jacks 3. Mounted on and extending upwardly from the base member 1, somewhat centrally thereof, is a pedestal 4 containing a hydraulic elevating mechanism B shown in dotted lines in FIG. 3. The elevating mechanism B may be of any conventional type ordinarily used for surgical operating tables, but is preferably of the type more fully shown and described in United States Letters Patent No. 3,046,071 granted July 24, 1962. Bolted or otherwise rigidly attached to the upper end of the elevating mechanism B is a base ring 6 having a telescoping cylindrical sleeve or skirt s for concealing the elevating mechanism B when it is in fully extended or elevated position. Rigidly mounted upon and extending upwardly from the base ring 6 is a heavy-walled hollow cylindrical cap 7 forming a relatively large chamber r above the base ring 6, as best seen in FIG. 3 and for purposes presently more fully appearing. The jacks 3 and elevating mechanism B are movable responsive to actuation of a foot pedal 8 which is operatively connected interiorly of the base member 1 to a suitable hydraulic mechanism of the type also more fully shown and described in the above-mentioned copending application.

The cap 7 has an upwardly presented face 9 that is integrally provided with an upwardly extending clevis 10 for journaling and supporting a shaft 11. The shaft 11 rockably supports a laterally tiltable intermediate support member or post-like casting 12 that extends upwardly from said shaft. The casting 12 has two integrally depending downwardly extending flanges 13 that are in alignment with the upwardly extending clevis 10 and are pivotally mounted on the shaft 11. The casting 12 is provided with an outwardly extending annular flange 14. Integrally formed on the casting 12 slightly upwardly of the flange 14 is an upwardly extending journal boss 15 having a horizontal bore 16 for rockably supporting a shaft 17.

Provided for operative disposition upon the pedestal assembly P is an articulated table-top member T including a seat section $a$ having a leg section $b$ hingedly connected along the forward transverse margin thereof and a back section $c$ hingedly connected along the rearward transverse margin thereof. Formed integrally with and projecting downwardly from the underside of the seat section $a$ are spaced parallel flanges 18, 18', which are suitably bored and supported upon the shaft 17 by means of sleeves 19 held in place by machine screws 20. The sleeves 19 are, in turn, fastened to the shaft 17 by means of a key 21, thereby enabling the seat section *a* to pivot with the shaft 17. The shaft 17 is also provided with a series of annularly extending sealing rings 22.

The casting 12 is provided with two axially extending tubular channels 23, 24, opening on its upwardly presented marginal face. The casting 12 is also provided with two radially extending tubular channels 25, 26, that open into the tubular channels 23, 24, respectively, on one end and on the outer peripheral surface of the casting 12 at the other end. The tubular channels 25, 26, moreover, are threaded at their peripheral openings to receive pipe fittings 27, 28. The shaft 17 is also provided with two tubular channels 31, 32, extending diametrally therethrough and opening on the peripheral face of the shaft 17. The channels 31, 32, furthermore, are in alignment with tubular channels 23, 24. The shaft 17 is also provided with two axially extending tubular channels 33, 34, that open on the laterally presented end faces of the shaft 17 and intersects the channels 31, 32. The bore 16 of the boss 15 is undercut to provide two annularly extending circular grooves 35, 36, that are in alignment with the radially extending tubular channels 31, 32. It will, therefore, be evident that hydraulic fluid can flow up through the inlet channels 25, 23, 31, and 33 and back through the channels 34, 32, 24, 26, regardless of relative positon of the shaft 17 and seat section *a*.

A hydraulic pump 37 is mounted within the chamber *r* on the inner face of the cap member 7 and extends downwardly therefrom. Operatively connected to the hydraulic pump 37 is an electric motor 38 with a motor starting switch 39. The motor 38 is suitably mounted on the bottom portion of the pump 37 and extends downwardly therefrom. To conform to surgical operating room requirements, the motor 38 should be explosion-proof and the starting switch 39 should be incorporated within the motor casing. Preferably formed as an integral part of the cap 7 is a fluid reservoir or sump 40. The pump 37 is operatively connected to the tubular channel 23 by flexible tubing 41. Similarly, the fluid reservoir 40 is connected to the tubular channel 26 by flexible tubing 42. Finally, the pump 37 is connected by a tubular conduit 43 to a fitting 44 mounted in the lowest point of the sump 40 and having a removable stud 45 which carries a small oil-filtering screen 46, all as best seen in FIG. 3.

As above noted, the table-top T consists of three operatively connected sections, a seat section *a*, a leg section *b*, and a back section *c*, the latter being conventionally provided with a head rest 47, each of which is provided with a conventional type of pad 48, 49, 50, 51, respectively adapted to fit on the respective table-top sections. The pad 48 is preferably provided with a depressed portion 52 adapted to conform to the natural contour of the human body. Integrally formed on the seat section *a* are two downwardly extending side plates 53, 54, terminating at their lower margins approximately in the plane of the upper end of the cap 7. The seat section *a* is provided with a rearwardly extending flange 59 on each of its laterally presented margins. Similarly, the leg section *b* is provided on its laterally presented margins with forwardly extending flanges 60 that are in alignment with and overlie the flanges 59 of the seat section 45. Each of the pairs of flanges 59, 60, has aligned apertures extending therethrough for accommodating a shaft 61 to pivotally mount the leg section *b* adjacent to the seat section *a*. The seat section *a* has a forwardly extending flange 63 on the forward edge of each of its laterally presented margins. Similarly, the back section *c* is provided with a rearwardly extending flange 64 on the rearward portion of each of the laterally presented margins. The pairs of flanges 63 and 64 are adapted for overlying engagement and are provided with apertures to accept a shaft 65 to pivotally mount the back section *c* adjacent to the seat section *a*. The back section *c* is provided with a forwardly extending flange 66 on the forward edge of each of the laterally pre-sented margins. Similarly, the head rest 47 is provided with a rearwardly extending flange 67 on the rearward edge on each of its laterally presented margins. Each of the pairs of flanges 66, 67 is adapted for overlying engagement and is provided with apertures to accept a shaft 68 to pivotally mount the head rest 47 adjacent to the back section *c*, as illustrated in FIG. 2.

Each of the articulated top sections *a*, *b*, *c*, is provided with elongated slide rails 69 on each of the laterally presented side faces for supporting surgical equipment accessories of the type often used in major operating rooms.

Integrally formed on the upwardly presented face 9 of the cap 7 is a clevis 70 for pivotally mounting a double-acting hydraulic cylinder 71 having a piston rod 72 pivotally connected to horizontal pin 73 integrally formed on and projecting rearwardly from the outer peripheral surface of the casting 12. Thus, the casting 12 and operating table-top T can be laterally tilted by actuating the cylinder 71 about the shaft 11 from the position shown in full lines to the position shown in dotted lines in FIG. 6, or to any intermediate position. Integrally formed on and projecting outwardly from the casting 12 is a boss 74 for rockably supporting a double-acting hydraulic cylinder 75 having a piston rod 76 which is pivotally connected at its outer end to a downwardly extending flange 77 integrally formed on the bottom portion of the seat section *a*. Integrally formed on the inner surface of the side plate 54 is a boss 78 for pivotally supporting a double-acting hydraulic cylinder 79 having a piston rod 80, which is, in turn, pivotally connected to the rearwardly and downwardly extending flange 64 for rotating the back section *c* about the shaft 65. A double-acting hydraulic cylinder 81 having a piston rod 82 is pivotally connected to the forwardly extending flange 60 of the leg section *b* so as to swing it about the shaft 61.

Integrally formed on, and extending angularly outwardly from, the side plate 53 is an elongated hollow arm 83 terminating conveniently near the head end of the operating table A, and being provided on its outwardly presented side face with a hinged or otherwise removably secured cover plate which provides access to the interior of the arm 83. On its rearwardly presented end the arm 83 is provided with a transverse wall 85 having a centrally located oblong-rectangular opening 86. Also formed integrally on the rearward end of the arm 83 and projecting rearwardly beyond the transverse wall 85 is a perimetral flange 87, the outer face of which is indented or relieved slightly from the adjacent side faces of the arm 83, all as best seen in FIGS. 12 and 16, and for purposes presently more fully appearing.

Rigidly secured to the transverse wall 85 by means of bolts 89 is a push-button valve assembly V which spans the aperture 86 and extends rearwardly therefrom. The valve assembly V consists of seven rectilinear valve-blocks 90, 91, 92, 93, 94, 95, 96, a base block 97, a top plate 98, and a bottom plate 99, all held in stacked relation as shown in FIG. 14 by means of a plurality of elongated stacking bolts 100 which extend through suitably aligned and registering apertures around the perimeter of the valve assembly V. The top plate 98 and the bottom plate 99 project rearwardly beyond the rear transverse face of the valve blocks 90, 91, 92, 93, 94, 95, 96, and base block 97, and at their outer ends, are rigidly connected by an end plate 101 which is secured thereto by means of bolts 102 and is thereby held in outwardly spaced parallel relation to the transverse end faces of the valve blocks 90, 91, 92, 93, 94, 95, 96, and base block 97.

Slidably mounted in and extending through the end plate 101 are seven vertically spaced pairs of horizontal push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$. These pairs of push-buttons are respectively in endwise alignment with the valve blocks 90, 91, 92, 93, 94, 95 96.

Figure 18:
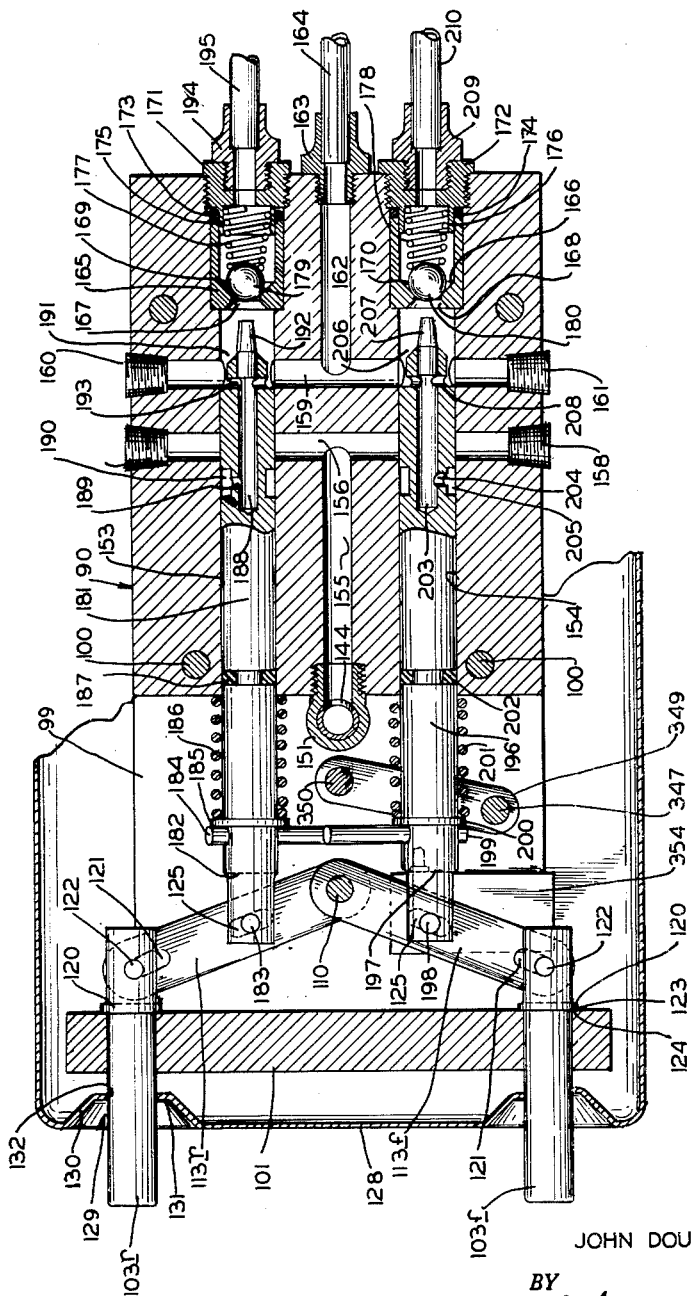
Figure 19:
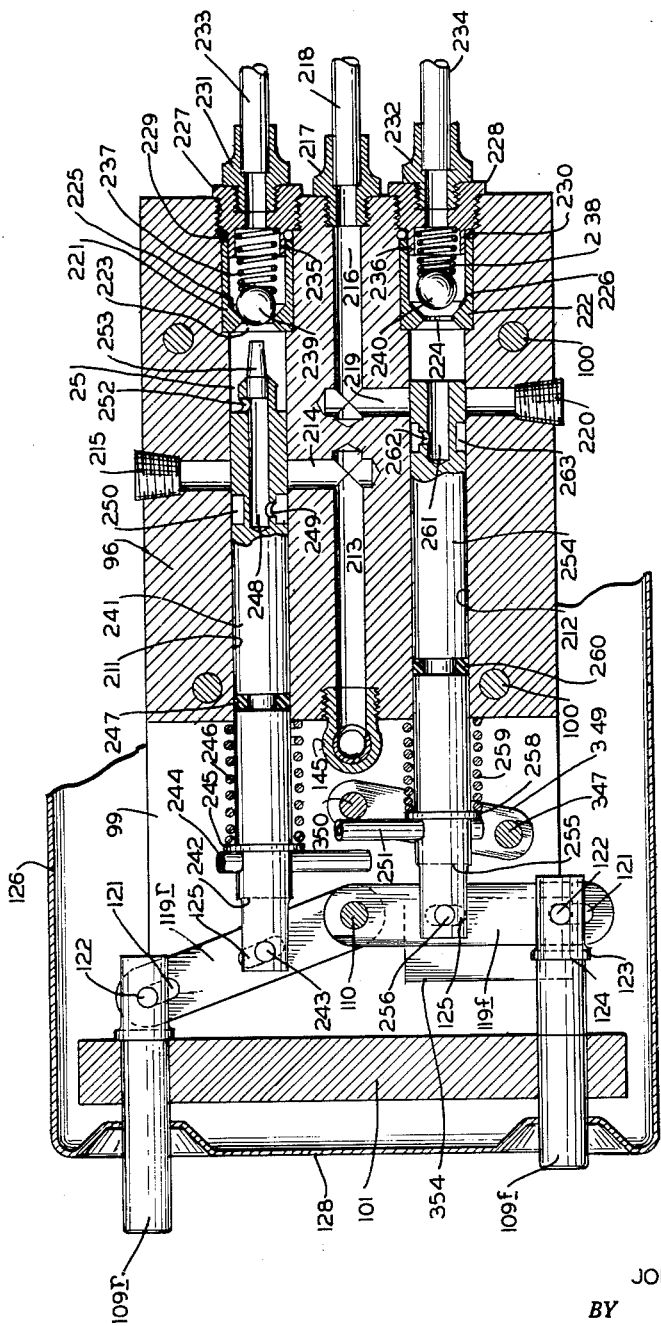

Mounted at its ends in and extending lengthwise between the top plate 98 and the bottom plate 99, approximately centrally between the lateral margins thereof, and midway between the transverse end faces of the valve blocks 90, 91, 92, 93, 94, 95, 96, and the end plate 101, is a stationary pivot rod 110 which is held in place by cotter pins 111 and washers 112. Swingably mounted on the pivot rod 110 and extending in rearwardly and laterally diverging relationship therefrom are pairs of flat link-bars 113$^r$, 113$^f$, 114$^r$, 114$^f$, 115$^r$, 115$^f$, 116$^r$, 116$^f$, 117$^r$, 117$^f$, 118$^r$, 118$^f$, 119$^r$, 119$^f$, which respectively correspond to, and are operatively associated with, the pairs of push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$, each of the latter being provided at its interior end with a transversely milled slot 120 for loose fitting engagement with the outer ends of the corresponding links 113$^r$, 113$^f$, 114$^r$, 114$^f$, 115$^r$, 115$^f$, 116$^r$, 116$^f$, 117$^r$, 117$^f$, 118$^r$, 118$^f$, 119$^r$, 119$^f$. Moreover, each of the links 113$^r$, 113$^f$, 114$^r$, 114$^f$, 115$^r$, 115$^f$, 116$^r$, 116$^f$, 117$^r$, 117$^f$, 118$^r$, 118$^f$, 119$^r$, 119$^f$, is provided at its outer end with a short elongated slot 121 for operative engagement with a pin 122 extending diametrically through the slotted ends of the push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$. Finally, each of the interior ends of the push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$, with a diametrally enlarged collar 123 having an annular abutment face 124 for limiting the rearward or outward movement thereof. Thus, when, for example, the push-button 109$^f$ is manually pushed inwardly it will swing its associated link 119$^f$ forwardly (i.e., to the right), as shown in FIG. 19. In this connection, it should also be noted that each of the links 113$^r$, 113$^f$, 114$^r$, 114$^f$, 115$^r$, 115$^f$, 116$^r$, 116$^f$, 117$^r$, 117$^f$, 118$^r$, 118$^f$, 119$^r$, 119$^f$, is provided intermediate its end with a second elongated slot 125, all as best seen in FIGS. 17, 18, and 19, and for purposes presently more fully appearing.

The entire valve assembly V is enclosed, primarily for purposes of aesthetic appearance, in a box-like sheet metal housing 126 which is attached by means of screws 127 to the face 88 of the flange 87 and integrally includes a transverse end wall 128 which is stamped inwardly to provide fourteen concave recesses 129, each having inwardly beveled side walls 130 and a flat bottom wall 131 provided with a concentric aperture 132 for loose fitting clearance around the push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$. The end wall 128 is also centrally provided with a vertical row of indicia-plates 133, 134, 135, 136, 137, 138, 139, which respectively read "LAT," "LEG," "BACK," "SEAT," "FLEX," "PROC," and "ELEV." As will be seen by reference to FIG. 11, the indicia-plate 133 is located midway between the push-buttons 103$^r$, 103$^f$. The indicia-plate 134 is located midway between the push-buttons 104$^r$, 104$^f$. The indicia-plate 135 is located midway between the push-buttons 105$^r$, 105$^f$. The indicia-plate 136 is located midway between the push-buttons 106$^r$, 106$^f$. The indicia-plate 137 is located midway between the push-buttons 107$^r$, 107$^f$. The indicia-plate 138 is located midway between the push-buttons 108$^r$, 108$^f$, and, finally, the indicia-plate 139 is located midway between the push-buttons 109$^r$, 109$^f$. The base-block 97 is provided with a single central bore 140 which is provided at its forward end with a threaded nipple 141 extending through the opening 85 for connection to a conduit or hydraulic line 142. At its rear end, the bore 140 is provided with a threaded elbow 143 which is connected to the lower end of a vertical header-pipe 144 which is, in turn, provided along its length with six T-fittings 145, 146, 147, 148, 149, 150, and terminating at its upper end in a second elbow 151. As will be seen by reference to FIG. 17, the upper elbow 151 and the T-fittings 150, 149, 148, 147, 146, and 145, are respectively aligned centrally with the valve blocks 90, 91, 92, 93, 94, 95, and 96, and form part of a common return line to the low pressure side of the hydraulic system or sump 40, the line 142 being connected at its remote end through a fitting 152 through the channel 34.

The valve blocks 90, 91, 92, 93, and the valve mechanisms operatively associated therewith are identical and, therefore, it is sufficient to describe only one of them, namely, the valve block 90, detail. As will be seen by reference to FIG. 18, the valve block 90 is provided with two parallel longitudinal bores 153, 154, which are located in outwardly spaced equidistant relationship to a smaller central bore 155, the latter opening into and communicating with the elbow 151, and terminating at its interior end in a transversely extending cross-bore 156, which, for convenience, is drilled through the valve block 90 from side to side and is closed at its opposite ends by threaded plugs 157, 158. The valve block 90 is also provided with a second transversely extending cross-bore 159 which is located in forwardly spaced parallel relation to the cross-bore 156 and, for similar reasons of manufacturing convenience, is drilled entirely through the valve block 90 from side to side, being closed at its opposite ends by threaded plugs 160, 161. Also drilled centrally into the valve block 90 from the forward end thereof is a longitudinal bore 162 which is located preferably in coaxial alignment with the bore 155 and communicates at its forward end with a threaded nipple 163 extending through the aperture 85 and being connected to a conduit or hydraulic line 164. At its rearward or interior end the bore 162 opens into and communicates with the cross-bore 159.

At their forward ends, the bores 153, 154, are counterbored for snugly receiving cylindrical seat-shells 165, 166, which are respectively provided with diametrally reduced concentric apertures 167, 168, opening onto conical valve seats 169, 170. At their forward ends the counterbored portions of the bores 153, 154, are internally threaded for receiving bushings 171, 172, respectively, which are internally shouldered to bear against O-rings 173, 174, by which the seat-shells 165, 166, are held securely and in oil-tight relationship within the valve-box 90. The bushings 171, 172, are integrally provided with tubular sleeve-like extensions 175, 176, respectively, sized for fitting concentrically within the seat-shells 165, 166, and being adapted for supporting compression springs 177, 178, which bear against ball checks 179, 180, sized for oil-tight valve-forming disposition within the seats 169, 170.

Shiftably mounted within the bore 153 is a valve plunger 181 which projects rearwardly from the valve block 90 and at its rearward end is provided with a transversely extending milled slot 182 for embracing engagement with the link 113$^r$ and being provided with a diametrally extending pin 183 for operative connection with the slot 125 of the link 113$^r$. Extending diametrally through the plunger 181, a short distance forwardly of the slot 182, is a downwardly and inwardly projecting pin 184 which retains a washer 185 bearing against the rearward end of a compression spring 186 mounted encirclingly about the rearwardly projecting end of the plunger 181 and bearing, so as to bias the plunger 181 to the rearwardly disposed position shown in FIG. 18. Internally within the valve block 90 the plunger 181 is provided with an O-ring 187 which seals the plunger 181 against the unauthorized leakage of high pressure hydraulic fluid. In its interior end, the plunger 181 is provided with an axial duct 188 which communicates, at its rearward end, through a radial duct to an annularly undercut channel 190 which is positioned lengthwise along the plunger 181 so as to be out of communication with the cross-bore 156 when the plunger 181 is in rearwardly disposed or so-called "normal" position. However, when the plunger 181 is pushed forwardly responsive to inward pushing movement applied to the push-button 103$^r$, the channel 190 will line up with the cross-bore 156 and permit oil to flow through the ducts 188, 189, and channel 190, to the cross-bore 156 and thence outwardly through the bore 155 to the return header.

At its forwardmost end, the plunger 181 is turned down so as to provide an annular clearance space 191 which is aligned with the cross-bore 159 when the valve plunger 181 is in "normal" position. Finally, the forwardmost end of the duct or bore 188 is closed with a plug 192 which projects forwardly therefrom and is small enough in external diametral size to fit freely through the aperture 167 of the seat-shell 165 and unseat the ball check 179 whenever the valve plunger 181 is pushed forwardly. However, when the plunger 181 is in normal position the plug 192 will be in rearwardly disposed relationship to the aperture 167 and will not interfere in any way with the flow of fluid therethrough. The duct or bore 188 is also provided at its forward end with a radial duct 193 which communicates with the annular space 191. When the plunger 181 is in "normal" position, the channel 190 will be sealed off and, therefore, the fact that the duct 193 opens into the annular space 191 is of no consequence. However, when the plunger 181 is pusher forwardly so that the plug 192 unseats the ball check 179 the full-sized part of the plunger 181 rearwardly of the duct 193 will move forwardly and seal off the cross-bore 159. At the same time the ball check 179 is unseated so that hydraulic fluid under pressure can flow through the duct 193 into the duct 188 and thence outwardly through the duct 189 and channel 190 into the cross-bore 156. Conversely, when the plunger 181 is in the "normal" position high pressure hydraulic fluid from the line 164 will flow through the bore 162 and the cross-bore 159 forcing the ball check 179 outwardly away from the seat 169 through the fitting 194 and fluid line 195.

Shiftably mounted in the bore 154 is a valve plunger 196 which projects rearwardly from the valve block 90 and at its rearward end is provided with a transversely extending milled slot 197 for embracing engagement with the link 113$^f$ and being provided with a diametrally extending pin 198 for operative connection with the slot 125 of the link 113$^f$. Extending diametrally through the plunger 196, a short distance forwardly of the slot 197, is a downwardly and inwardly projecting pin 199 which retains a washer 200 bearing against the rearward end of a compression spring 201 mounted encirclingly about the rearwardly projecting end of the plunger 196 and bearing, so as to bias the plunger 196 to the rearwardly disposed position shown in FIG. 18. Internally within the valve block 90 the plunger 196 is provided with an O-ring 202 which seals the plunger 196 against the unauthorized leakage of high pressure hydraulic fluid. In its interior end, the plunger 196 is provided with an axial duct 203 which communicates, at its rearward end, through a radial duct to an annularly undercut channel 205 which is positioned lengthwise along the plunger 196 so as to be out of communication with the cross-bore 156 when the plunger 196 is in rearwardly disposed or so-called "normal" position. However, when the plunger 196 is pushed forwardly responsive to inward pushing movement applied to the push-button 103$^f$, the channel 205 will line up with the cross-bore 156 and permit oil to flow through the ducts 203, 204, and channel 205, to the cross-bore 156 and thence outwardly through the bore 155 to the return header.

At its forwardmost end, the plunger 196 is turned down so as to provide an annular clearance space 206 which is aligned with the cross-bore 159 when the valve plunger 196 is in "normal" position. Finally, the forwardmost end of the duct or bore 203 is closed with a plug 207 which projects forwardly therefrom and is small enough in external diametral size to fit freely through the aperture 168 of the seat-shell 166 and unseat the ball check 180 whenever the valve plunger 196 is pushed forwardly. However, when the plunger 196 is in normal position the plug 207 will be in rearwardly disposed relationship to the aperture 168 and will not interfere in any way with the flow of fluid therethrough. The duct or bore 203 is also provided at its forward end with a radial duct 208 which communicates with the annular space 206. When the plunger 196 is in "normal" position, the channel 205 will be sealed off and, therefore, the fact that the duct 208 opens into the annular space 206 is of no consequence. However, when the plunger 196 is pushed forwardly so that the plug 207 unseats the ball check 180 the full-sized part of the plunger 196 rearwardly of the duct 208 will move forwardly and seal off the cross-bore 159. At the same time the ball check 180 is unseated so that hydraulic fluid under pressure can flow through the duct 208 into the duct 203 and thence outwardly through the duct 204 and channel 205 into the cross-bore 156. Conversely, when the plunger 196 is in the "normal" position high pressure hydraulic fluid from the line 164 will flow through the bore 162 and the cross-bore 159 forcing the ball check 180 outwardly away from the seat 169 through the fitting 209 and fluid line 210.

The valve block 96 is provided with two spaced parallel bores 211, 212, which are located in spaced parallel relationship equidistantly on opposite sides of a central bore 213 which extends rearwardly through the valve block 96 and communicates with the T-fitting 145 of the return header 144. At its interior end the bore 213 opens into a transveresly extending bore 214 which is drilled inwardly from one side of the valve block 94 to approximately the middle thereof for intersection with the bore 213. The outer end of the bore 213 is closed by a threaded plug 215. Similarly, the forward end of the valve block 96 is provided with a central bore 216 which communicates at its forward end with a fitting 217 connected to a conduit or fluid line 218. At its interior end the bore 216 opens into and communicates with a transversely extending bore 219 which is drilled inwardly from the opposite side of the valve block 96 and is closed at its outer end by a threaded plug 220. It should be in this connection that the bore 213 communicates only with the bore 211 and the bore 216 communicates only with the bore 212. At their forward ends the bores 211, 212, are counterbored for snugly receiving seat-shells 221, 222, respectively, which are substantially identical with the previously described seat-shells 165, 166, and have concentric apertures 223, 224, which open onto conical valve seats 225, 226. Threaded into the outer end of the counterbored portions of the bores 211, 212, are bushings 227, 228, which abut against O-rings 229, 230, that hold the seat-shells 221, 222, in place and provide an oil-tight seal therefor. Threaded into the outer ends of the bushings 227, 228, are conduit fittings 231, 232, which respectively are connected to conduits or fluid lines 233, 234. On their interior ends the bushings 227, 228, are integrally provided with tubular sleeve-like portions 235, 236, which fit snugly within the seat-shells 221, 222, respectively, and support compression springs 237, 238, which bear operatively against ball checks 239, 240, the latter being adapted to seat in fluid-tight position within the valve seats 225, 226, respectively.

Shiftably mounted within the bore 211 and extending rearwardly therefrom is a valve plunger 241 which is provided at its rear end with a transversely milled slot 242 disposed embracingly around the link 119$^r$ and is operatively connected thereto by means of a pin 243 which extends through the slot 125 of the link 119$^r$. Extending diametrally through the plunger 241 just forwardly of the milled slot 242 is a downwardly and inwardly projecting pin 244 which engages and positions a washer 245 abutting against the rearward end of a compression spring 246 which, in turn, abuts at its other end against the rearwardly presented end face of the valve block 96 and biases the plunger rearwardly to the so-called "normal" position, as shown in FIG. 19.

Interiorly of the valve block 96 the plunger 241 is provided with an O-ring 247 which operatively seals the plunger 241 against fluid leakage. In its interior end the plunger 241 is provided with an axial bore or duct 248 which communicates at its inner end through a radial duct 249 to an undercut annular channel 250, the latter being positioned so as to be rearward of and out of communication with the cross-bore 214 when the plunger 241 is in "normal" position. However, when the plunger 241 is pushed forwardly by manual actuation of the push-button 109ʳ the annular channel 250 will move forwardly into line with the cross-bore 214. At its forwardmost end the plunger 241 is turned down to provide a clearance space 251 which is connected through a radial duct 252 to the forward end of the duct or bore 248. Forwardly of the radial duct 252, the bore or duct 248 is sealed by a plug 253 which is substantially smaller in diametral size than the opening or passage 223 and is adapted to project therethrough and push the ball check 239 off of seated position when the plunger 241 is pushed forwardly away from "normal" position. Thus, when the plunger 241 is in "normal" position the ball check 239 will operate in the manner of an ordinary check valve and hold pressure within the line 233. On the other hand, when the plunger 241 is pushed forwardly away from "normal" position the ball check 239 will be unseated and any liquid under pressure within the line 233 will flow rearwardly through the aperture or passage 223 and thence through the clearance space 251 and radial duct 252 into the duct or bore 248 and thence outwardly through the radial duct 250 and annular channel 249 to the cross-bore 214.

Shiftably mounted within the bore 212 is a valve plunger 254 which extends rearwardly from the valve block 96 and at its rear end is provided with a transversely milled slot 255 disposed embracingly around the link 119ᶠ and connected thereto by a pin 256 which is operatively engaged in the slot of the link 119ᶠ. Extending diametrally through the plunger 254 just forwardly of the milled slot 255 is an upwardly and inwardly projecting pin 257 which engages and positions a washer 258 abuttingly engaged against the rearward ends of a compression spring 259 which, in turn, abuts at its forward end against the rearwardly presented end face of the valve block 96.

Internally of the valve block 96, the plunger 254 is provided with an O-ring 260 which seals the plunger against fluid leakage. In its forward end, the plunger 254 is provided with an axial bore or duct 261 which is connected by means of a radial duct 262 to an undercut annular channel 263 which is located rearwardly of the cross-bore 219 when the plunger 254 is in rearwardly shifted or so-called "normal" position. At its forwardmost end the duct or bore 261 opens directly into the forward portion of the bore 212 and communicates therethrough with the aperture or passage 224. Thus, when the plunger 254 is in "normal" position flow from the cross-bore 219 through the aperture or passage 224 is completely cut off. On the other hand, when the plunger 254 is pushed forwardly away from "normal" position, the annular channel 263 will line up with the cross-bore 219 and oil under pressure will flow from the cross-bore 219 through the annular channel 263 and radial duct 262 into the bore or duct 261 and thence through the passage or aperture 224 outwardly through the conduit 234. It will, of course, be evident by reference to FIG. 19 that the ball check 240 does not impede flow in this direction. However, when the plunger 254 is in "normal" position, the ball check 240 will act as a conventional check valve and will prevent reverse flow through the line 234.

The valve blocks 94 and 95 are identical. Therefore, it is necessary to describe only one of them, namely, the valve block 94. The valve block 94 is provided with two spaced parallel bores 264, 265, which are located equidistantly on opposite sides of the longitudinal center line of the valve block 94 and are interconnected by five transversely extending spaced parallel cross-bores 266, 267, 268, 269, 270. As will be seen by reference to FIG. 21, the cross-bores 266, 267, 268, and 270 are located above the plane of the longitudinal center line of the bores 264, 265, whereas, the cross-bore 269 is located below the plane. Similarly, the cross-bores 268 and 270 are interconnected by a central longitudinally extending bore 271 which is also located above the plane of the center line of the bores 264, 265, and, finally, the cross-bore 269 is connected to the interior end of a bore 272 which lies below such plane. The bore 271 extends forwardly and is provided with a threaded conduit fitting 273 for connection to a conduit or hydraulic line 274. Similarly, the bore 272 extends rearwardly and is connected by means of a T-fitting 276 to the return header 144. For convenience of manufacture, the bores 269, 270, are drilled straight through the valve block 94 from side to side and are sealed at their outer ends by threaded plugs 277, 278, and 279, 280, respectively. The cross-bores 266, 267, 268, are also drilled transversely through the valve block 94 and are respectively provided at their outer ends with conduit fittings 281, 282, 283, 184, 285, 286, for connection to conduits or fluid lines 287, 288, 289, 290, 291, 292.

Shiftably mounted within the bore 264 is a valve plunger 293 which projects rearwardly from the valve block 94 and on its rear end is provided with a transversely milled slot 294 for embracing disposition around the link 117ʳ being operatively connected thereto by means of a diametral pin 295 which extends through the slot 125 of the link 117ʳ. Extending diametrally through the plunger 293 just forwardly of the milled slot 294 is a downwardly and inwardly projecting pin 296 which engages and positions a washer 297 abutting against the rearward end of a compression spring 298 disposed encirclingly about the rearwardly projecting end of the plunger 293 and abutting at its forward end against the rearwardly presented end face of the valve block 94 to bias the plunger 293 rearwardly into the so-called "normal" position shown in FIG. 20.

Interiorly of the valve block 94, the plunger 293 is provided with an O-ring 299 which seals the plunger against fluid leakage. Along its interior length the plunger 293 is provided with axially spaced undercut annular channels 300, 301, 302, 303. The channels 300, 301, are respectively located in line with the cross-bores 266, 267, when the plunger 293 is in "normal" position. The channels 302, 303, are respectively located rearwardly and out of line with the cross-bores 268, 269, when the plunger 293 is in "normal" position, but will come into line with the cross-bores 268, 269, respectively, when the plunger 293 is manually shifted forwardly away from "normal" position. In its forward end, the plunger 293 is provided with an axial duct 304 which terminates adjacent to the annular channel 303 and is connected thereto by radial ducts 305, 305'. At its forwardmost end the plunger 293 is turned down to provide a clearance space 306 which is connected to the duct 304 by a radial duct 307 and, finally, the forward end of the duct 304 is closed with a plug 308.

The forward end of the bore 264 is counterbored for snugly receiving a cylindrical seat-shell 309 having a transverse end wall 310 which is provided with a concentric aperture or passage 311 opening forwardly onto a conical valve seat 312. At its forward end the counterbored portion of the bore 264 is threadedly provided with a bushing 313 which bears against an O-ring 314 adapted for holding the seat-shell 309 securely in oil-tight disposition within the valve block 94. On its interior end the bushing 313 is integrally provided with a cylindrical sleeve-like extension 315 which extends into the seat-shell 309 and supports a compression spring 316 which bears at its rearward end against a ball check 317 adapted for fluid-tight seated disposition within the valve seat 312. At its outer end the bushing 313 is threadedly provided with a conduit fitting 318 for connection to a conduit or fluid line 319.

Shiftably mounted wtihin the bore 264 is a valve plunger 320 which projects rearwardly from the valve block 94 and on its rear end is provided with a transversely milled slot 321 for embracing disposition around the link 117$^f$ being operatively connected thereto by means of a diametral pin 322 which extends through the slot 125 of the link 117$^f$. Extending diametrally through the plunger 320 just forwardly of the milled slot 321 is an upwardly and inwardly projecting pin 323 which engages and positions a washer 324 abutting against the rearward end of a compression spring 325 disposed encirclingly about the rearwardly projecting end of the plunger 320 and abutting at its forward end against the rearwardly presented end face of the valve block 94 to bias the plunger 320 rearwardly into the so-called "normal" position shown in FIG. 20.

Interiorly of the valve block 94, the plunger 320 is provided with an O-ring 326 which seals the plunger against fluid leakage. Along its interior length the plunger 320 is provided with axially spaced undercut annular channels 327, 328, 329, 330. The channels 327, 328, are respectively located in line with the cross-bores 266, 267, when the plunger 320 is in "normal" position. The channels 329, 330, are respectively located rearwardly and out of line with the cross-bores 268, 269, when the plunger 320 is in "normal" position, but will come into line with the cross-bores 268, 269, respectively, when the plunger 320 is manually shifted forwardly away from "normal" position. In its forward end, the plunger 320 is provided with an axial duct 331 which terminates adjacent to the annular channel 330 and is connected thereto by radial ducts 332, 332'. At is forwardmost end the plunger 320 is turned down to provide a clearance space 333 which is connected to the duct 331 by a radial duct 334 and, finally, the forward end of the duct 331 is closed with a plug 335.

The forward end of the bore 264 is counterbored for snugly receiving a cylindrical seat-shell 336 having a transverse end wall 337 which is provided with a concentric aperture or passage 338 opening forwardly onto a conical valve seat 339. At its forward end the counterbored portion of the bore 264 is threadedly provided with a bushing 340 which bears against an O-ring 341 adapted for holding the seat-shell 336 securely in oil-tight disposition within the valve block 94. On its interior end the bushing 340 is integrally provided with a cylindrical sleeve-like extension 342 which extends into the seat-shell 336 and supports a compression spring 343 which bears at its rearward end against a ball check 344 adapted for fluid-tight seated disposition within the valve seat 339. At is outer end the bushing 340 is threadedly provided with a conduit fitting 345 for connection to a conduit or fluid line 346.

It should be noted in this connection that the plugs 308 and 335 are substantially smaller in diametral size than the apertures 311, 338, respectively, and will project freely therethrough. Thus, when the plunger 293 is shifted forwardly from its "normal" position, the plug 308 will push the ball check 317 away from seated position allowing hydraulic fluid to flow reversely through the line 319 and through the aperture or passage 311 into the duct 304 and thence outwardly through the cross-bore 269 and bore 272 to the return header 144. On the other hand, whenever the plunger 293 is in "normal" position fluid will flow from the conduit 274 through the bore 271 and cross-bore 270 into the forward portion of the bore 264 and thence past the ball check 217 into the conduit 319. It will, of course, be understood that the ball check 219 will not impede flow in this direction. Similarly, when the plunger 320 is pushed forwardly away from "normal" position, the plug 335 will push the ball check 344 away from seated position and permit return flow from the conduit 346. On the other hand, when the plunger 320 is in "normal" position fluid will flow from the conduit 274 through the cross-bore 270 and the forward portion of the bore 265 past the ball check 344 and through the conduit 346. The ball check 344 will, of course, not impede flow in this direction.

Rockably mounted at its ends in and extending lengthwise between the plates 98, 99, in forwardly spaced parallel relation to the rod 111 is a shaft 347 which is rigidly provided with two radial arms 348, 349, respectively located below the plate 98 and above the plate 99. At their outer ends, the arms 348, 349, are rigidly connected by a lengthwise extending bar 350 which lies approximately along the center line of the valve assembly V forwardly of the inwardly projecting pins 184, 199, 244, 257, 296, and 323. Hooked at one end around the rod 350 and at its other end around the rod 110 is a tension spring 351 which biases the rod 350 and arms 348, 349, rearwardly. The arm 349 is provided with an adjustable abutment screw 352 adapted for endwise engagement against the actuating plunger 353 of a normally closed micro-switch 354. Thus, when all of the various push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$, are in "normal" or non-actuated position, the spring 351 will hold the rod 350 in rearwardly swung position and the micro-switch 354 will be held in open position. However, when any one of the push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$, is pushed inwardly, such as, for example, the push-button 109$^f$, as shown in FIG. 14, the link 119$^f$ associated therewith will be swung inwardly and correspondingly the pin 323 will rock the rod 350 forwardly swinging the arm 349 to the position shown in FIG. 16 and thereby allowing the micro-switch 354 to complete an electrical circuit to starting switch 39 of the pump motor 38.

The valve assembly V, the hydraulic pump 37, the elevating mechanism B, and the four double-acting hydraulic cylinders 71, 75, 79, and 81, are interconnected in a hydraulic circuit as schematically shown in FIG. 22. This hydraulic circuit also includes a four-circuit pilot-operated spool-valve PV$^1$, a seven-circuit pilot-operated spool-valve PV$^2$, a two-circuit volumetric or so-called "positive displacement" flow divider FD$^1$, and a three-circuit volumetric or so-called "positive displacement" flow divider FD$^2$. The pilot valve and flow dividers are conventional hydraulic components and, therefore, are not shown or described herein in specific detail. It is sufficient for present purposes merely to note that the pilot valve PV$^1$ includes an axially shiftable spool 355 which is normally held in "off" position by means of a spring 356 and will be shifted into "on" position when pressure is applied to the cylinder 357. Similarly, the pilot valve PV$^2$ includes an axially shiftable spool 358 which is normally held in "off" position by a spring 359 and is shifted to "on" position when fluid under pressure is supplied to the cylinder space 360. The flow divider FD$^1$ is, in effect, a small gear pump or turbine having two rotating members which are permanently interconnected by a shaft so that when one of the rotating members is rotated by the hydraulic fluid flowing through its chamber the other rotating member will be required to rotate at the same speed. Assuming that the two rotating members are of the same size and rotate within chambers of the same volumetric capacity, two flow paths or circuits through the flow divider FD$^1$ will be established in which the fluid-flow will be volumetrically the same. It is also possible to vary the proportionate flow in the two circuits by varying the relative volumetric displacement of the two rotating members and the chambers in which they respectively operate. Similarly, the flow divider FD$^2$ includes three rotating members respectively operating within three separate chambers and interconnected by a single shaft.

Finally, the hydraulic circuit includes a check valve 361 which is inserted in the main pressure line 41 coming from the pump 37. Actually, as a matter of manufacturing convenience, the check valve 361 would ordinarily be installed as a part of the fitting by which the pressure line 41 is connected to the housing of the pump 37 and serves to prevent reverse flow of hydraulic fluid through the pump 37 whenever the pump is inactive.

As will be seen by reference to the hydraulic circuit diagram, FIG. 22, when operating, the pump 37 continually pressurizes the entire fluid system and the piston of the hydraulic cylinders 71, 75, 79, 81, are held stationary between bodies of fluid on either side at identical pressures, thereby compensating for any tendency to change positions due to fluid leakage or other causes within the system. Thus, when any one of the push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$, is manually pressed inwardly, the particular hydraulic cylinder associated therewith will be hydraulically connected to the fluid return line, thus causing the pressure drop on that side of the cylinder. Since the cylinder is double-acting, pressure on the other side will urge the piston toward the port of reduced pressure. When the push-buttons 103$^r$, 103$^f$, 104$^r$, 104$^f$, 105$^r$, 105$^f$, 106$^r$, 106$^f$, 107$^r$, 107$^f$, 108$^r$, 108$^f$, 109$^r$, 109$^f$, are in the "normal" or "off" position, there is always a constant pressure maintained on both sides of the pistons within the cylinders 71, 75, 79, 81, holding them stationary and affording substantially immediate response upon actuation of any one of the push-buttons 103$^r$, 103$^f$, 104$^r$, 104$^f$, 105$^r$, 105$^f$, 106$^r$, 106$^f$, 107$^r$, 107$^f$, 108$^r$, 108$^f$. It will also be evident by reference to FIG. 22 that the push-buttons 109$^r$, 109$^f$, are solely connected to, and control, the elevating mechanism B in the usual manner. In other words, when the push-button 109$^f$ is pressed inwardly, the elevating mechanism will raise and when the push-button 109$^r$ is pushed in the weight of the table-top T will force the elevating mechanism downwardly and the supporting column of hydraulic fluid will flow, at reduced pressure, to the return side of the hydraulic system.

In use, and for purposes of illustration, it may be assumed that the operating table-top T is normally in the flat or horizontal position, that is to say, the position shown in FIGS. 1, 2, 4, and 5. As will be evident by reference to FIG. 22 the hydraulic cylinder 71 which controls the lateral tilting movement is operatively connected to the valve block 90 and, as previously pointed out, the piston rod 72 is held in stationary position between stationary bodies of hydraulic fluid at equal and opposing pressures since the ball checks 179, 180, of the valve block 90 serve as mutually cooperating check valves and prevent outward flow of hydraulic fluid from either side of the cylinder 71. If, however, the push-button 103$^f$ is pushed inwardly the plunger 196 will be pushed forwardly unseating the ball check 180 and allowing hydraulic fluid to flow through the conduit 142 outwardly to the return or low pressure side of the hydraulic system. Since the manipulation of the push-button 103$^f$ will also rock the arm 349 forwardly allowing the micro-switch 354 to close, the pump 37 will be set in operation and will deliver hydraulic fluid under pressure through the conduit 164 in the manner previously described and thence to the conduit 195 so that as pressure is relieved from one side of the cylinder 71 pressure will be applied to the other side and the piston rod 72 will move in the direction of the low pressure side, as long as the push-button 103$^f$ is held inwardly or until the limit of movement is reached. If the push-button 103$^r$ is pushed inwardly, the opposite sequence of operations will occur.

The hydraulic cylinders 75, 79, and 81, which are respectively associated with the seat, back and leg sections, and are hydraulically connected to the valve blocks 93, 92, and 91, can be caused to function in exactly the same manner as described above in connection with the hydraulic cylinder 71.

It will also be evident from FIG. 22 that the cross-bores 266 of the valve blocks 94, 95, are connected in series by means of the conduits 362, 364, 365, to the high-pressure inlet duct or bore 162 of the valve blocks 91, 92, and 93. Consequently, as long as the plungers 293 and 320 of the valve blocks 94, 95, are in "normal" position, high-pressure fluid will be supplied from the pump 37 to the valve blocks 91, 92, and 93, whenever the pump 37 is actuated. Meanwhile, the pilot valves PV$^1$ and PV$^2$ remain in "off" or "closed" position since the cylinders 357, and 360, are connected, respectively, to the conduits 366, 367, and by-pass conduits 368, 369, to the cross-bores 267, 268. Since the cross-bores 268, which are connected to the pressure side of the system, are closed when the plungers 293 and 320 are in "normal" position, and, contrariwise, the cross-bores 267 are open and connected to the return or low-pressure side of the hydraulic system, the springs 356, 359, will hold the spools 355, 358, in this "off" position. Consequently, the valve blocks 94, 95, and associated valve mechanism which may be referred to as the compound position valves, will not have any effect on the hydraulic cylinders 71, 75, 79, 81. It is, therefore, possible to adjust the table-top T laterally as a separate movement, adjust the leg section relatively to the seat section as a separate movement, adjust the back section relatively to the seat section as a separate movement, and, finally, adjust the seat section itself relatively to the support casting 12, as a separate movement. By this means, it is possible to move the table-top T from the position shown in FIG. 2 to any one of the positions shown in FIGS. 4, 5, 6, 7, and 10, as well as to any intermediate positions.

If, on the other hand, it is desired to move the table-top T to a compound position, such as those illustrated in FIGS. 8 and 9, this can be accomplished by either manipulating the valve mechanisms of the valve block 94 or the valve mechanisms of the valve block 95, as the case may be. For instance, if the surgeon requires that the patient be placed in the so-called "proctoscopic" position which is the position shown in FIG. 9, the push-button 108$^r$ is pushed inwardly thereby unseating the ball check 317 of the valve block 95 and thereby allowing metered fluid-flow from the hydraulic cylinders 75, 79, and 81, through the conduits 370, 371, 372, to the return or low-pressure side of the hydraulic system. This flow will take place by reason of the fact that the inward movement of the plunger 293 will simultaneously cut off all pressure through the line 365 to the valve blocks 91, 92, 93, and admit fluid under pressure to the line 367 of the pilot valve PV$^2$, causing the spool 358 to shift to the right (reference being made to FIG. 22). This movement of the spool 358 will, of course, compress the spring 359, inasmuch as the chamber which holds the spring 359 is vented to atmosphere through a vent duct 373. If a reverse proctoscopic position is desired, the push-button 108$^f$ may be pushed inwardly and the hydraulic cylinders 75, 79, 81, will be caused to move in the opposite direction. In this connection, it should be noted that the flow divider FD$^2$ will meter the flow volumetrically through the line 371 and line 372 regardless of the direction of such flow.

If, on the other hand, the surgeon happens to require that the patient be placed in the so-called "flex" position, which is the position shown in FIG. 8, the push-button 107$^r$ can be pressed in. This also cuts off pressure to the line 365 and admits pressure to the line 366 and cylinder 357 of the pilot valve PV$^1$, thereby shifting the spool 355 to "on" position. Such movement of the spool 355 will compress the spring 356 since the chamber which holds the spring 356 is vented to atmosphere through a vent duct 374. The inward movement of the push-button 107$^r$ will unseat the ball check 317 within the valve block 94 and allow fluid to flow outwardly from the hydraulic cylinders 75 and 79 through the conduits 375, 376, and the flow divider FD$^1$ to the return or low-pressure side of the hydraulic system. At the same time hydraulic fluid under pressure will flow inwardly through the line 377 and line 378 to the opposite side of the hydraulic cylinders 75, 79, with the result that the piston rods 76 and 80 will move downwardly with respect to the hydraulic cylinders 75, 79 (i.e., to the left, as shown schematically in FIG. 22). If the surgeon requires the reverse-flex position, or so-called "reflex" position, the push-button 107$^f$ will be pushed inwardly and the opposite series of movements will be obtained.

It should, of course, be understood, in connection with the above-described compounds positions, that the positions shown in FIGS. 8 and 9 are extreme positions. Any intermediate position may also be obtained by releasing the appropriate push-button when the table has moved into the desired intermediate position.

It should be understood that changes, and modifications in the form, construction, arrangement, and combination of the several parts of the hydraulically actuated surgical operating table may be made and substituted for those herein shown and described without departing from the nature and principle of my invention.

Having thus described my invention, what I claim and desire to secure by Letters Patent is:

1. An operating table comprising a base, a pedestal swingably mounted on said base for vertical shifting movement, an intermediate support member swingably mounted on said pedestal, a seat section swingably mounted on said intermediate support member, a leg section swingably mounted adjacent one end of the seat section, a back section swingably mounted adjacent the other end of the seat section, hydraulic driving means operatively connected to said seat section for laterally tilting said seat section, hydraulic driving means operatively connected to said leg section for independently swinging said leg section, hydraulic driving means operatively connected to said back section for independently swinging said back section, hydraulic driving means operatively connected to said seat section for longitudinally tilting said seat section, means for supplying fluid under pressure to each of said hydraulic driving means, said last-named means comprising an electric motor, a fluid pump operatively connected to said motor, a fluid reservoir, means connecting said fluid reservoir to said fluid pump, a separate push-button valve means operatively connected to each of said driving means, pressure regulating valve means operatively associated with said push-button valve means, and means for connecting said push-button valve means to said pump, whereby fluid may be supplied to said hydraulic driving means through said valve means.

2. An operating table comprising a base, a pedestal member mounted on said base for vertical shifting movement, an intermediate support member swingably mounted on said pedestal, a seat section swingably mounted on said intermediate support member, a leg section swingably mounted adjacent one end of the seat section, a back section swingably mounted adjacent the other end of the seat section, a first hydraulic cylinder operatively connected to said pedestal and said support member for laterally tilting said seat section, a second hydraulic cylinder operatively connected to said intermediate support member and said seat section for longitudinally tilting said seat section, a third hydraulic cylinder operatively connected to said leg section for independently swinging said leg section, a fourth hydraulic cylinder operatively connected to said back section for independently swinging said back section, means for supplying hydraulic fluid under pressure to each of said hydraulic cylinders, a first two-way valve means for operating said first hydraulic cylinder, a second two-way valve means for operating said second hydraulic cylinder, a third two-way valve means for operating said third hydraulic cylinder, a fourth two-way valve means for operating said fourth hydraulic cylinder, and a fifth two-way valve means for simultaneously operating said second and said fourth hydraulic cylinders.

3. An operating table comprising a base, a pedestal member mounted on said base for vertical shifting movement, an intermediate support member swingably mounted on said pedestal, a seat section swingably mounted on said intermediate support member, a leg section swingably mounted adjacent one end of the seat section, a back section swingably mounted adjacent the other end of the seat section, a first hydraulic cylinder operatively connected to said pedestal and said support member for laterally tilting said seat section, a second hydraulic cylinder operatively connected to said intermediate support member and said seat section for longitudinally tilting said seat section, a third hydraulic cylinder operatively connected to said leg section for independently swinging said leg section, a fourth hydraulic cylinder operatively connected to said back section for independently swinging said back section, means for supplying hydraulic fluid under pressure to each of said hydraulic cylinders, a first two-way valve means for operating said first hydraulic cylinder, a second two-way valve means for operating said second hydraulic cylinder, a third two-way valve means for operating said third hydraulic cylinder, a fourth two-way valve means for operating said fourth hydraulic cylinder, a fifth two-way valve means for simultaneously operating said second and said fourth hydraulic cylinders, and a sixth two-way valve means for simultaneously operating said second, third, and fourth hydraulic cylinders.

4. An operating table comprising a base, a pedestal member mounted on said base for vertical shifting movement, an intermediate support member swingably mounted on said pedestal, a seat section swingably mounted on said intermediate support member, a leg section swingably mounted adjacent one end of the seat section, a back section swingably mounted adjacent the other end of the seat section, a first hydraulic cylinder operatively connected to said pedestal and said support member for laterally tilting said seat section, a second hydraulic cylinder operatively connected to said intermediate support member and said seat section for longitudinally tilting said seat section, a third hydraulic cylinder operatively connected to said leg section for independently swinging said leg section, a fourth hydraulic cylinder operatively connected to said back section for independently swinging said back section, means for supplying hydraulic fluid under pressure to each of said hydraulic cylinders, a first push-button valve means for operating said first hydraulic cylinder, a second push-button valve means for operating said second hydraulic cylinder, a third push-button valve means for operating said third hydraulic cylinder, a fourth push-button valve means for operating said fourth hydraulic cylinder, a fifth push-button valve means for simultaneously operating said second and said fourth hydraulic cylinders, and a sixth push-button valve means for simultaneously operating said second, third, and fourth hydraulic cylinders.

5. An operating table comprising a base, a pedestal member mounted on said base for vertical shifting movement and having a cap member at its upper end, an intermediate support member swingably mounted on said pedestal, a seat section swingably mounted on said cap member, a leg section swingably mounted adjacent one end of the seat section, a back section swingably mounted adjacent the other end of the seat section, a first hydraulic ram means operatively connected to said pedestal and said base for laterally tilting said seat section, a second hydraulic ram means operatively connected to said pedestal and said seat section for longitudinally tilting said seat section, a third hydraulic ram means operatively connected to said leg section for independently swinging said leg section, a fourth hydraulic ram means operatively connected to said back section for independently swinging said back section, means for supplying hydraulic fluid under pressure to each of said hydraulic ram means, said last-named means comprising a fluid pump mounted on the inner surface of said cap member and extending downwardly within said pedestal, an electric motor operatively connected to and mounted on the bottom face of said pump, and a fluid reservoir mounted on the inner surface of said cap member adjacent said pump, said pump being operatively connected to said reservoir and said pump and reservoir being operatively connected to said hydraulic ram means.

6. An operating table comprising a base, a pedestal member mounted on said base for vertical shifting movement, a cap member mounted on the upper end of said pedestal and having upwardly extending clevis-forming means, an intermediate support member swingably mounted on said clevis-forming means, a transverse horizontally extending shaft rotatably mounted on the upper end of said intermediate support member, a seat section rigidly mounted on said shaft, a leg section swingably mounted adjacent one end of the seat section, a back section swingably mounted adjacent the other end of the seat section, a first hydraulic ram means operatively connected to said pedestal and said base for laterally tilting said seat section, a second hydraulic ram means operatively connected to said pedestal and said seat section for longitudinally tilting said seat section, a third hydraulic ram means operatively connected to said leg section for independently swinging said leg section, a fourth hydraulic ram means operatively connected to said back section for independently swinging said back section, means for supplying hydraulic fluid under pressure, said means including a motor-driven pump, a fluid reservoir mounted within said pedestal, and means formed in said intermediate support member and said shaft hydraulically connecting the pump and the reservoir to the hydraulic ram means.

7. An operating table comprising a base, a pedestal member mounted on said base for vertical shifting movement, a cap member mounted on the upper end of said pedestal and having upwardly extending clevis-forming means, an intermediate support member swingably mounted on said clevis-forming means, a transverse horizontally extending shaft rotatably mounted on the upper end of said intermediate support member, a seat section rigidly mounted on said shaft, a leg section swingably mounted adjacent one end of the seat section, a back section swingably mounted adjacent the other end of the seat section, a first hydraulic ram means operatively connected to said pedestal and said base for laterally tilting said seat section, a second hydraulic ram means operatively connected to said pedestal and said seat section for longitudinally tilting said seat section, a third hydraulic ram means operatively connected to said leg section for independently swinging said leg section, a fourth hydraulic ram means operatively connected to said back section for independently swinging said back section, means for supplying hydraulic fluid under pressure, said means including a motor-driven pump, a fluid reservoir mounted within said pedestal, said intermediate support member and said shaft having a series of fluid supply channels and a series of fluid return channels formed therein, means for connecting said pump to said fluid supply channels, means for connecting said fluid return channels to said fluid reservoir, and means for connecting said fluid return channels and said fluid supply channels to said hydraulic ram means.

8. An operating table comprising a base, a pedestal member mounted on said base for vertical shifting movement, a cap member mounted on the upper end of said pedestal and having upwardly extending clevis-forming means, an articulated top pivotally mounted on said clevis-forming means, hydraulic ram means operatively connected to said articulated top for operating said articulated top, hydraulic fluid supply means for supplying fluid under pressure to said hydraulic ram means, said hydraulic fluid supply means including a motor-driven pump, a fluid reservoir mounted within said pedestal, said intermediate support member and said shaft having a series of fluid supply channels and a series of fluid return channels formed therein, flexible tubing means for connecting said pump to said fluid supply channels, flexible tubing means for connecting said fluid return channels to said fluid reservoir, and means for connecting said fluid return channels and said fluid supply channels to said hydraulic ram means.

9. An operating table comprising a base, a pedestal member mounted on said base for vertical shifting movement, a cap member mounted on the upper end of said pedestal and having upwardly extending clevis-forming means, an articulated top having a plurality of sections which are swingable relative to each other, separate hydraulic ram means operatively connected to said pedestal and said articulated top, hydraulic fluid supply means for supplying fluid under pressure to said hydraulic ram means, said hydraulic fluid supply means including a motor-driven pump, a fluid reservoir mounted within said pedestal, said intermediate support member and said shaft having a series of fluid supply channels and a series of fluid return channels formed therein, flexible tubing means for connecting said pump to said fluid supply channels, flexible tubing means for connecting said fluid return channels to said fluid reservoir, and flexible tubing means for connecting said fluid return channels and said fluid supply channels to said hydraulic ram means.

10. An operating table comprising a base, a pedestal member mounted on said base for vertical shifting movement, a cap member mounted on the upper end of said pedestal and having upwardly extending clevis-forming means, an intermediate support member swingably mounted on said clevis-forming means, a transverse horizontally extending shaft rotatably mounted on the upper end of said intermediate support member, a seat section rigidly mounted on said shaft, a leg section swingably mounted adjacent one end of the seat section, a back section swingably mounted adjacent the other end of the seat section, a first hydraulic ram means operatively connected to said pedestal and said base for laterally tilting said seat section, a second hydraulic ram means operatively connected to said pedestal and said seat section for longitudinally tilting said seat section, a third hydraulic ram means operatively connected to said leg section for independently swinging said leg section, a fourth hydraulic ram means operatively connected to said back section for independently swinging said back section, means for supplying hydraulic fluid under pressure, said means including a motor-driven pump, a fluid reservoir mounted within said pedestal, said intermediate support member having a vertical fluid supply channel and a radial supply channel opening into said vertical supply channel, said support member also having a vertical fluid return channel and a radial return channel opening into said vertical fluid return channel; said shaft having an axial fluid supply channel and a radial fluid supply channel communicating therewith, said shaft also having an axial fluid return channel and a radial fluid supply channel communicating therewith, means for providing continuous communication between said vertical supply channel and said radial supply channel of the shaft and means for providing continuous communication between said vertical return channel and said radial return channel of the shaft for continuous fluid passage when said shaft is rotated to any position, flexible tubing means for connecting the radial supply channel of said support member to said pump, flexible tubing means for connecting the radial return channel of said support member to said fluid reservoir, and flexible tubing means for connecting said axial supply and return channels of said shaft to said hydraulic ram means.

11. In an operating table of the type described, a double-acting hydraulic cylinder having two coacting ports, a piston slidably mounted within said cylinder for reciprocative movement, a pump, a fluid reservoir hydraulically connected to said pump, and valve means having manually operable push-button means normally disposed in non-actuated position, said valve means being operatively connected to said hydraulic cylinder and to the pump in such a manner that when the manually operable push-button means is in non-actuated position the two ports of the hydraulic cylinder are connected through the valve means to the pressure side of the pump, said valve means also being connected to the reservoir in such a manner that when the push-button means is manually actuated one of said ports will be disconnected from the pressure side of the pump and connected instead to the reservoir whereby the piston will be displaced in the direction of such port.

12. In an operating table of the type described, a fluid supply means having a high pressure supply line and a low pressure return line, hydraulic ram means having two ports and a piston operatively mounted thereon for reciprocating movement intermediate said ports, push-button valve means having two coaxially extending bores, one of said bores being connected to one of said ports and the other of said bores being connected to the other of said ports, a normally biased closed check-valve at one end of each of said bores and interposed between the bore with which it is associated and the port to which such bore is connected, a valve-plunger slidably mounted within each of said bores, a push-button operatively associated with each of said valve-plungers, each of said valve-plungers respectively being adapted to open the check-valve associated therewith when said push-button is pressed, said valve-plungers respectively being adapted to operatively connect said hydraulic ram means to said supply means when the push-buttons are in non-actuated position and said valve-plungers also being adapted to operatively connect said ram means to said low-pressure return line when said push-button is pressed.

13. In an operating table of the type described, a fluid supply means, a fluid return means, hydraulic ram means, a push-button valve means consisting of a valve housing having two coaxially extending bores, a normally biased closed check-valve at one end of each of said bores, valve-plunger means slidably mounted within each of said bores, a push-button operatively associated with each of said valve-plunger means, link means operatively associated with each of said valve plunger means, said link means being adapted to energize said fluid supply means when said push-button is pressed, means for connecting each of said bores to said hydraulic ram means, each of said valve-plunger means being adapted to open the check-valve associated therewith when said push-button is pressed and fluid carrying means operatively connecting each of the bores of said valves to said fluid-supply means, thereby maintaining equal pressure on each side of said piston when said push-buttons are unactuated and said check-valves are closed.

14. In an operating table of the type described, a fluid supply means, a fluid return means, hydraulic ram means, a push-button valve means consisting of a valve housing having two coaxially extending bores, one of said bores being connected to one of said ports and the other of said bores being connected to the other of said ports, a normally biased closed check-valve at one end of each of said bores and interposed between the bore with which it is associated and the port to which such bore is connected, a valve-plunger slidably mounted within each of said bores, a push-button operatively connected to each of said valve-plungers, means for biasing each of said valve-plungers away from the check-valves, whereby to cause each of said push-buttons to be positioned outwardly of said housing in a normal off position, means mounted on the forward end of each of said valve-plungers for opening said check-valves when the push-button associated therewith is pressed away from normal off position, each of said valve-plungers having an axially extending tubular channel, means for causing hydraulic communication between said tubular channels and said check-valves, means for hydraulically connecting said check-valves to opposite ends of said hydraulic ram means, means for causing hydraulic communication between said fluid supply means and each of said tubular channels when said plungers are in the rearwardly extended position, whereby equal pressure can be maintained on both sides of said ram means, and means for causing hydraulic communication with said fluid return means when either of said push-buttons is pressed, thereupon said valve-plunger will cause said check-valve to open, causing a pressure drop on that side of the hydraulic ram means.

15. The push-button valve means of claim 14 wherein each of the valve-plungers have a link means operatively associated therewith, each of said link means being adapted to energize said fluid supply means when the push-button associated therewith is pressed.

16. In an operating table of the type described, a fluid supply means, a fluid return means operatively connected to said fluid supply means, double acting hydraulic ram means having a movable piston, a push-button valve having two coaxially extending bores, a normally biased closed check-valve at one end of each of said bores, a valve-plunger slidably mounted within each of said bores, a push-button operatively associated with each of said valve-plungers, fluid carrying means connecting each of said bores to said hydraulic ram means, each of said valve-plungers being adapted to open the check-valve associated therewith when said push-button is pressed, fluid-carrying means operatively connecting each of the bores of said valves to said fluid supply means and thereby maintaining equal pressure on each side of said piston when said push-buttons are actuated and said check-valves are closed, and means operatively associated with each of said valve-plungers for maintaining fluid communication between the fluid return means and that side of the piston with which the valve-plunger is associated for causing reduced pressure on said last-named side of the piston.

17. In an operating table of the type described, a fluid supply means, fluid return means operatively connected to the fluid supply means, a plurality of double acting hydraulic rams each having a movable piston, a plurality of push-button valves having two coaxially extending bores, each of said valves being associated with a specific hydraulic ram, a normally closed check-valve at one end of each of the bores in each push-button valve, a valve-plunger slidably mounted within each of said bores, a push-button operatively associated with each of said valve-plungers, fluid-carrying means connecting each of said bores to said hydraulic ram means, each of said valve-plungers being adapted to open the check-valve associated therewith when said push-button is pressed, fluid-carrying means operatively connecting each of the bores of said valves to said fluid supply means and thereby maintaining equal pressure on each side of said piston when said push-buttons are actuated and said check-valves are closed, means operatively associated with each of said valve-plungers for maintaining fluid communication between the fluid return means and that side of the piston with which the valve-plunger is associated for causing reduced pressure on said last-named side of the piston, and means operatively connected to each of said push-buttons for preventing the actuation of all but one push-button.

18. In an operating table of the type described, a fluid supply means including a source of hydraulic fluid, a fluid pump, and electric motor means for operating said pump, fluid return means operatively connected to the fluid supply means, a plurality of double acting hydraulic rams each having a movable piston, a plurality of push-button valves having two coaxially extending bores, each of said valves being associated with a specific hydraulic ram, a normally closed check-valve at one end of each of the bores in each push-button valve, a valve-plunger slidably mounted within each of said bores, a push-button operatively associated with each of said valve-plungers, fluid-carrying means connecting each of said bores to said hydraulic ram means, each of said valve-plungers being adapted to open the check-valve associated therewith when said push-button is pressed, fluid-carrying means operatively connecting each of the bores of said valves to said fluid supply means and thereby maintaining equal pressure on each side of said piston when said push-buttons are actuated and said check-valves are closed, means operatively associated with each of said valve-plungers for maintaining fluid communication between the fluid return means and that side of the piston with which the valve-plunger is associated for causing reduced pressure on said last-named side of the piston, and electrically actuating means operatively connected to each of said push-buttons for energizing said electric motor means when any one push-button is actuated.

19. An operating table comprising a base, a pedestal member mounted on said base for vertical shifting movement, a cap member mounted on the upper end of said pedestal and having upwardly extending clevis-forming means, an intermediate support member swingably mounted on said clevis-forming means, a transverse horizontally extending shaft rotatably mounted on the upper end of said intermediate support member, an articulated table top operatively connected on said horizontally extending shaft, hydraulic ram means operatively connected to said table top for moving said table top into various positions, means for supplying hydraulic fluid under pressure to said hydraulic ram means, said means including a motor-driven pump, a fluid reservoir mounted within said pedestal, said intermediate support member having a vertical fluid supply channel and a radial supply channel opening into said vertical supply channel, said support member also having a vertical fluid return channel and a radial return channel opening into said vertical fluid return channel, said shaft having an axial fluid supply channel and a radial fluid supply channel communicating therewith, said shaft also having an axial fluid return channel and a radial fluid supply channel communicating therewith, means for providing continuous communication between said vertical supply channel and said radial supply channel of the shaft and means for providing continuous communication between said vertical return channel and said radial return channel of the shaft for continuous fluid passage when said shaft is rotated to any position, flexible tubing means for connecting the radial supply channel of said support member to said pump, flexible tubing means for connecting the radial return channel of said support member to said fluid reservoir, and flexible tubing means for connecting said axial supply and return channels of said shaft to said hydraulic ram means.

20. In an operating table of the type described, a fluid supply means, fluid return means operatively connected to the fluid supply means, a plurality of double acting hydraulic rams each having a movable piston, a plurality of push-button valves having two coaxially extending bores, each of said valves being associated with a specific hydraulic ram, a normally closed check-valve at one end of each of the bores in each push-button valve, a valve-plunger slidably mounted within each of said bores, a push-button operatively associated with each of said valve-plungers, fluid-carrying means connecting each of said bores to said hydraulic ram means, each of said valve-plungers being adapted to open the check-valve associated therewith when said push-button is pressed, fluid-carrying means operatively connecting each of the bores of said valves to said fluid supply means and thereby maintaining equal pressure on each side of said piston when said push-buttons are actuated and said check-valves are closed, means operatively associated with each of said valve-plungers for maintaining fluid communication between the fluid return means and that side of the piston with which the valve-plunger is associated for causing reduced pressure on said last-named side of the piston, and pressure-regulating means operatively associated with each push-button valve for regulating the amount of pressure imposed on the hydraulic ram means associated with each valve.

21. In an operating table of the type described, a fluid supply means including a source of hydraulic fluid, a fluid pump, and electric motor means for operating said pump, fluid return means operatively connected to the fluid supply means, a plurality of double acting hydraulic rams each having a movable piston, a plurality of push-button valves having two coaxially extending bores, each of said valves being associated with a specific hydraulic ram, a normally closed check-valve at one end of each of the bores in each push-button valve, a valve-plunger slidably mounted within each of said bores, a push-button operatively associated with each of said valve-plungers, fluid-carrying means connecting each of said bores to said hydraulic ram means, each of said valve-plungers being adapted to open the check-valve associated therewith when said push-button is pressed, fluid-carrying means operatively connecting each of the bores of said valves to said fluid supply means and thereby maintaining equal pressure on each side of said piston when said push-buttons are actuated and said check-valves are closed, means operatively associated with each of said valve-plungers for maintaining fluid communication between the fluid return means and that side of the piston with which the valve-plunger is associated for causing reduced pressure on said last-named side of the piston, electrically actuating means operatively connected to each of said push-buttons for energizing said electric motor means when any one push-button is actuated, means operatively associated with each push-button for preventing the actuation of all but one push-button, and pressure-regulating means for regulating the amount of pressure imposed on the hydraulic ram means associated with each valve.

22. An operating table comprising a base, a pedestal mounted on said base for vertical shifting movement, an intermediate support member swingably mounted on said pedestal, a seat section swingably mounted on said intermediate support member, a leg section swingably mounted adjacent one end of the seat section, a back section swingably mounted adjacent the other end of the seat section, hydraulic driving means operatively connected to said pedestal for laterally tilting said seat section, hydraulic driving means operatively connected to said leg section for independently swinging said leg section, hydraulic driving means operatively connected to said back section for independently swinging said back section, hydraulic driving means operatively connected to said seat section for longitudinally tilting said seat section, means for supplying fluid under pressure, said last-named means comprising an electric motor, a fluid pump operatively connected to said motor, a fluid reservoir, means connecting said fluid reservoir to said fluid pump, push-button valve means operatively connected to said driving means, each of said push-button valve means consisting of two independently operated valves, one of said valves being adapted to supply fluid under pressure to one of said driving means for operating in one direction and the other of said valves being adapted to supply fluid under pressure to said driving means for operation in the reverse direction, each of said valves further being adapted to maintain constant pressure on each side of said driving means when said valves are in the closed position, means associated with each of said valves for maintaining the side of the driving means with which it is associated in communication with the fluid reservoir, thereby putting that side under reduced pressure when said last named valve is opened, and link means operatively connecting said push-button valve means to said electric motor, whereby said electric motor can be energized when said push-button valve means is actuated.

(References on following page)

References Cited by the Examiner

UNITED STATES PATENTS

| | | | |
|---|---|---|---|
| 1,298,227 | 3/19 | Landis | 137—630.17 |
| 1,364,882 | 1/21 | Koken. | |
| 2,186,235 | 1/40 | Brown. | |
| 2,253,112 | 8/41 | Boysson. | |
| 2,520,455 | 8/50 | Clachko | 311—7 |
| 2,556,834 | 6/51 | Ashton et al. | |
| 2,636,348 | 4/53 | Murry | 60—52 |
| 2,700,583 | 1/55 | Davis et al. | 311—7 |
| 2,794,694 | 6/57 | Fullwood et al. | 311—7 |
| 2,898,168 | 8/59 | Thorpe | 311—7 |
| 3,028,732 | 4/62 | Shampaine et al. | 311—7 X |
| 3,041,120 | 6/62 | Burzlaff et al. | 311—7 |

ROBERT C. RIORDON, *Primary Examiner.*

GEORGE L. BREHM, *Examiner.*